United States Patent
Chen et al.

(10) Patent No.: US 11,614,514 B2
(45) Date of Patent: Mar. 28, 2023

(54) APPARATUS, SYSTEM AND METHOD OF GENERATING RADAR PERCEPTION DATA

(71) Applicant: INTEL CORPORATION, Santa Clara, CA (US)

(72) Inventors: Chulong Chen, Saratoga, CA (US); Pradyumna S. Singh, San Jose, CA (US); Saiveena Kesaraju, Mountain View, CA (US); Shengbo Xu, Newark, CA (US); Wenling Margaret Huang, Los Altos, CA (US); Ophir Shabtay, Tsofit (IL)

(73) Assignee: INTEL CORPORATION, Santa Clara, CA (US)

(*) Notice: Subject to any disclaimer, the term of this patent is extended or adjusted under 35 U.S.C. 154(b) by 173 days.

(21) Appl. No.: 16/831,915

(22) Filed: Mar. 27, 2020

(65) Prior Publication Data

US 2020/0225317 A1    Jul. 16, 2020

(51) Int. Cl.
*G01S 7/40* (2006.01)
*G01S 13/931* (2020.01)
(Continued)

(52) U.S. Cl.
CPC ............... *G01S 7/40* (2013.01); *G01S 7/415* (2013.01); *G01S 7/417* (2013.01); *G01S 13/58* (2013.01); *G01S 13/931* (2013.01); *G01S 7/4008* (2013.01)

(58) Field of Classification Search
CPC . G01S 7/417; G01S 7/415; G01S 7/40; G01S 13/58; G01S 13/931; G01S 7/4008
See application file for complete search history.

(56) References Cited

U.S. PATENT DOCUMENTS 6,369,700 B1* 4/2002 Yamada .................... G01S 7/35
                                                    340/904
6,882,303 B2* 4/2005 Samukawa ............. G01S 17/42
                                                    342/146
(Continued)

OTHER PUBLICATIONS

S. Saponara, M. S. Greco and F. Gini, "Radar-on-Chip/in-Package in Autonomous Driving Vehicles and Intelligent Transport Systems: Opportunities and Challenges," in IEEE Signal Processing Magazine, vol. 36, No. 5, pp. 71-84, Sep. 2019, doi: 10.1109/MSP.2019.2909074. (Year: 2019).*

(Continued)

*Primary Examiner* — Peter M Bythrow
(74) *Attorney, Agent, or Firm* — Shichrur & Co.

(57) ABSTRACT

For example, an apparatus may include a radar, the radar may include a reconfigurable radio configured, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals; a radar perception processor configured to generate radar perception data based on the digital radar samples, the radar perception data representing semantic information of an environment of the radar; and a feedback controller to configure the plurality of reconfigurable radio parameters based on the radar perception data, and to feedback the reconfigurable radio parameters to the reconfigurable radio.

24 Claims, 6 Drawing Sheets

(51) Int. Cl.
   *G01S 7/41* (2006.01)
   *G01S 13/58* (2006.01)

(56) References Cited

U.S. PATENT DOCUMENTS

| | | | | |
|---|---|---|---|---|
| 8,761,477 | B2* | 6/2014 | Walker | G01S 7/52026 |
| | | | | 382/131 |
| 10,859,693 | B1* | 12/2020 | Sabripour | G01S 7/4817 |
| 11,378,958 | B2* | 7/2022 | Shashua | G05D 1/0219 |
| 2007/0008211 | A1* | 1/2007 | Yamano | G01S 13/931 |
| | | | | 342/146 |
| 2010/0109938 | A1* | 5/2010 | Oswald | G01S 13/522 |
| | | | | 707/E17.014 |
| 2013/0110355 | A1* | 5/2013 | Cho | G01S 7/4026 |
| | | | | 701/49 |
| 2015/0138310 | A1* | 5/2015 | Fan | G06V 20/56 |
| | | | | 382/106 |
| 2016/0003938 | A1* | 1/2016 | Gazit | G01S 13/02 |
| | | | | 342/81 |
| 2016/0363651 | A1* | 12/2016 | Lim | G01S 7/34 |
| 2017/0254880 | A1* | 9/2017 | Smith | G01S 13/87 |
| 2018/0217255 | A1* | 8/2018 | Kim | G01S 13/931 |
| 2018/0348343 | A1* | 12/2018 | Achour | G01S 7/417 |
| 2019/0033439 | A1* | 1/2019 | Gu | G01S 13/72 |
| 2019/0137601 | A1* | 5/2019 | Driscoll | G01S 7/03 |
| 2019/0139403 | A1* | 5/2019 | Alam | G06T 17/005 |
| 2019/0146077 | A1* | 5/2019 | Kravets | H04B 17/391 |
| | | | | 455/67.11 |
| 2019/0277962 | A1* | 9/2019 | Ingram | G01S 7/4013 |
| 2019/0383904 | A1* | 12/2019 | Harrison | G01S 7/032 |
| 2020/0041612 | A1* | 2/2020 | Harrison | G01S 13/931 |
| 2020/0103498 | A1* | 4/2020 | Frank | G01S 7/4017 |
| 2020/0132812 | A1* | 4/2020 | Dvorecki | G01S 7/4026 |
| 2020/0133272 | A1* | 4/2020 | Chong | G05D 1/0088 |
| 2020/0358187 | A1* | 11/2020 | Tran | G06N 3/0454 |
| 2021/0025975 | A1* | 1/2021 | Seeber | G01S 13/86 |
| 2021/0156960 | A1* | 5/2021 | Popov | G01S 13/87 |
| 2021/0199755 | A1* | 7/2021 | Emadi | G01S 7/03 |
| 2021/0241026 | A1* | 8/2021 | Deng | G06K 9/6267 |
| 2021/0255304 | A1* | 8/2021 | Fontijne | G06V 20/70 |
| 2021/0293927 | A1* | 9/2021 | Tyagi | G01S 13/52 |
| 2021/0364620 | A1* | 11/2021 | Sun | G01S 7/40 |
| 2022/0065992 | A1* | 3/2022 | Gerardo Castro | G01S 13/931 |
| 2022/0172487 | A1* | 6/2022 | Ewert | G01S 15/931 |

OTHER PUBLICATIONS

B. Hilburn, T. O'Shea, T. Roy and N. West, "DeepSig: Deep Learning for Wireless Communications," Nvidia, Aug. 21, 2018. [Online]. Available: https://devblogs.nvidia.com/deepsig-deep-learning-wireless-communications, Aug. 21, 2018, 8 pages.
J. Lombacher, M. Hahn, J. Dickmann and C. Wöhler, "Potential of radar for static object classification using deep learning method," in 2016 IEEE MTT-S International Conference on Microwaves for Intelligent Mobility (ICMIM), San Diego, CA, 2016, 4 pages.
B. Hilburn, T. O'Shea, T. Roy and N. West, "DeepSig: Deep Learning for Wireless Communications," Nvidia, Aug. 18, 2018. [Online]. Available: https://devblogs.nvidia.com/deepsig-deep-learning-wireless-communications, Aug. 21, 2018, 8 pages.
Timothy J. O'Shea et al., "Deep Learning-Based MIMO Communications", arXiv:1707.07980v1 [cs.IT], Jul. 25, 2017, 9 pages.
Mark Buckler et al., "Reconfiguring the Imaging Pipeline for Computer Vision", The IEEE International Conference on Computer Vision (ICCV), arXiv:1705.04352v3 [cs.CV], Aug. 1, 2017, 15 pages.
Eli Schwartz et al., "DeepISP: Towards Learning an End-to-End Image Processing Pipeline", IEEE Transactions on Image Processsin, arXiv:1801.06724v2 [eess.IV], Feb. 3, 2019, 12 pages.
Chen Chen et al., "Learning to See in the Dark", The IEEE Conference on Computer Vision and Pattern Recognition (CVPR), arXiv:1805.01934v1 [cs.CV], May 4, 2018, 10 pages.
J. R. Guerci, "Cognitive Radar: A Knowledge-Aided Fully Adaptive Approach", 2010 IEEE Radar Conference. IEEE, 2010, 6 pages.
Pengfei Liu et al., "Cognitive Radar Using Reinforcement Learning in Automotive Applications", arXiv:1904.10739v1 [eess.SP], Apr. 24, 2019, 11 pages.
Joseph R. Guerci and Edward J. Baranoski, "Knowledge-Aided Adaptive Radar at DARPA", IEEE Signal Processing Magazine, vol. 23, No. 1, pp. 41-50, Jan. 2006, 10 pages.
Zhe Zhang et al., "A Hybrid Neural Network Framework and Application to Radar Automatic Target Recognition", IEEE Global Conference on Signal and Information Processing (GlobalSIP), arXiv:1809.10795v1 [eess.SP], Sep. 27, 2018, 5 pages.
Ashish Vaswani et al, "Attention is All You Need", arXiv:1706.03762v5 [cs.CL] Dec. 6, 2017, 15 pages.
"Introduction to mmWave sensing: FMCW radars", Retrieved from the Internet: http://www.ti.com, retrieved on [Feb. 26, 2020], 2 pages.
M. Kamran Shereen et al, "A brief review of frequency, radiation pattern, polarization, and compound reconfigurable antennas for 5G applications", Journal of Computational Electronics (2019) 18:1065-1102 https://doi.org/10.1007/s10825-019-01336-0, May 8, 2019, 38 pages.

* cited by examiner

US 11,614,514 B2

APPARATUS, SYSTEM AND METHOD OF GENERATING RADAR PERCEPTION DATA

TECHNICAL FIELD

Embodiments described herein generally relate to generating radar perception data.

BACKGROUND

A radar system may include an antenna array configured to transmit a plurality of transmit (Tx) radar signals, and to receive a plurality of Receive (Rx) radar signals based on the plurality of Tx radar signals.

The radar system may include a radar processor to process the Rx radar signals and to provide semantic information of an environment based on the Rx radar signals.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
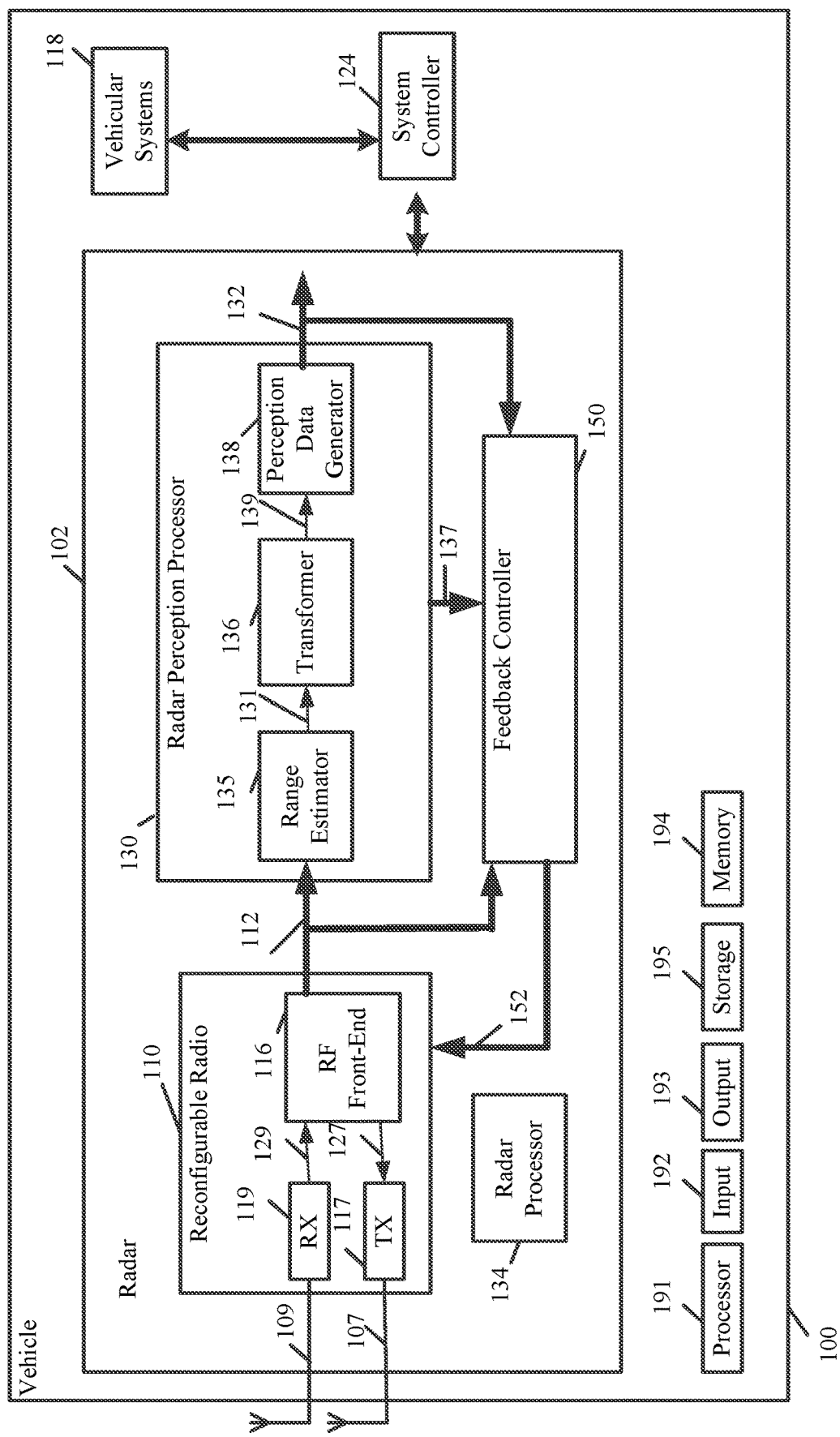
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some embodiments may be used in conjunction with Radio Frequency (RF) systems, radar systems, vehicular radar systems, detection systems, or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "communicating" as used herein with respect to a communication signal includes transmitting the communication signal and/or receiving the communication signal. For example, a communication unit, which is capable of communicating a communication signal, may include a transmitter to transmit the communication signal, and/or a communication receiver to receive the communication signal. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with an RF frequency in a frequency band having a starting frequency above 10 Gigahertz (GHz), for example, a frequency band having a starting frequency between 10 Ghz and 120 GHz. For example, some demonstrative embodiments may be used in conjunction with an RF frequency having a starting frequency above 30 Ghz, for example, above 45 GHz, e.g., above 60 GHz. For example, some demonstrative embodiments may be used in conjunction with an automotive radar frequency band, e.g., a frequency band between 76 GHz and 81 GHz. However, other embodiments may be implemented utilizing any other suitable frequency bands, for example, a frequency band above 140 GHz, a frequency band of 300 GHz, a sub Terahertz (Thz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies, and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to RF radar signals. However, other embodiments may be implemented with respect to any other radar signals, wireless signals, IR signals, acoustic signals, optical signals, wireless communication signals, communication scheme, network, standard, and/or protocol. For example, some demonstrative embodiments may be implemented with respect to systems, e.g., Light Detection Ranging (LiDAR) systems, and/or sonar systems, utilizing light and/or acoustic signals.

Reference is now made to FIG. 1, which schematically illustrates a block diagram of a system including an apparatus 100, e.g., a vehicle 100, in accordance with some demonstrative embodiments.

Some demonstrative embodiments are described herein with respect to a system including a vehicle, e.g., vehicle 100. Other embodiments may be implemented with respect to any other system, environment and/or apparatus 100, which may be implemented in any other object, environment, location, or place. For example, device 100 may include a non-vehicular device, which may be implemented, for example, in an indoor location, a stationary infrastructure outdoors, or any other location.

In some demonstrative embodiments, vehicle 100 may include a car, a truck, a motorcycle, a bus, a train, an airborne vehicle, a waterborne vehicle, a cart, a golf cart, an electric cart, a road agent, or any other vehicle.

In some demonstrative embodiments, vehicle 100 may include, and/or may be configured to support and/or implement, a vehicular system, for example, to be implemented and/or to be mounted in vehicle 100.

In some demonstrative embodiments, the vehicular system may include, for example, an autonomous vehicle system, an automated driving system, a driver assistance and/or support system, and/or the like.

In some demonstrative embodiments, vehicle 100 may include a radar 102. For example, radar 102 may include a radar detecting device, a radar sensing device, a radar sensor, or the like, e.g., as described below.

In some demonstrative embodiments, vehicle 100 may include a single radar 102. In other embodiments, vehicle 100 may include a plurality of radars 102.

In some demonstrative embodiments, radar 102 may include a Multiple Input Multiple Output (MIMO) radar, e.g., as described below. In one example, the MIMO radar may be configured to utilize "spatial filtering" processing, for example, beamforming and/or any other mechanism, for one or both of Transmit (Tx) signals and/or Receive (Rx) signals.

In other embodiments, radar 102 may include any other type of radar.

In some demonstrative embodiments, radar 102 may be configured to support one or more applications, usages, operations and/or tasks, e.g., as describe below.

In some demonstrative embodiments, radar 102 may be configured to support autonomous vehicle usage, e.g., as described below.

In one example, radar 102 may determine a class, a location, an orientation, a velocity, an intention, a perceptional understanding of the environment, and/or any other information corresponding to an object in the environment.

In another example, radar 102 may be configured to determine one or more parameters and/or information for one or more operations and/or tasks, e.g., path planning, and/or any other tasks.

In some demonstrative embodiments, radar 102 may be configured to support security usage, e.g., as described below.

In one example, radar 102 may be configured to determine a nature of an operation, e.g., a human entry, an animal entry, an environmental movement, and the like, to identity a threat level of a detected event, and/or any other additional or alternative operations.

In other embodiments, radar 102 may be configured to support any other usages and/or applications.

In some demonstrative embodiments, radar 102 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative embodiments, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative embodiments, the one or parameters, attributes and/or information with respect to the object may include a range of the objects from the vehicle 100, an angle of the object with respect to the vehicle 100, a location of the object with respect to the vehicle 100, a relative speed of the object, and/or the like. In some demonstrative embodiments, vehicle 100 may include a system controller 124 configured to control one or more functionalities, components, devices, systems and/or elements of vehicle 100.

In other embodiments, system controller 124 may be implemented by one or more additional or alternative elements of vehicle 100.

In some demonstrative embodiments, system controller 124 may be configured to control one or more vehicular systems 118 of vehicle 100, e.g., as described below.

In some demonstrative embodiments, vehicular systems 118 may include, for example, a steering system, a braking system, a driving system, and/or any other system of the vehicle 100.

In some demonstrative embodiments, system controller 124 may configured to control radar 102, and/or to process one or parameters, attributes and/or information from radar 102.

In some demonstrative embodiments, system controller 124 may be configured, for example, to control the vehicular systems 118 of the vehicle, for example, based on radar information from radar 102 and/or one or more other sensors of the vehicle, e.g., Light Detection and Ranging (LIDAR) sensors, camera sensors, imaging sensors, thermal imaging sensors, audio sensors, and/or the like.

In one example, system controller 124 may control the steering system, the braking system, and/or any other vehicular systems 118 of vehicle 100, for example, based on the information from radar 102, e.g., based on one or more objects detected by radar 102.

In other embodiments, system controller 124 may be configured to control any other additional or alternative functionalities of vehicle 100.

In some demonstrative embodiments, vehicle 100 may include, for example, one or more of a processor 191, an input unit 192, an output unit 193, a memory unit 194, and/or a storage unit 195. Vehicle 100 may optionally include other suitable hardware components and/or software components. In some demonstrative embodiments, some or all of the components of one or more of vehicle 100 may be enclosed in a common housing or packaging, and may be interconnected or operably associated using one or more wired or wireless links. In other embodiments, components of one or more of vehicle 100 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS), e.g., a vehicular operating system, of vehicle 100 and/or of one or more suitable applications.

In some demonstrative embodiments, input unit 192 may include, for example, a touch-screen, a touch-pad, a trackball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a Solid State Drive (SSD), a floppy disk drive, a Compact Disk (CD) drive, a CD-ROM drive, a DVD drive, or other suitable removable or non-removable storage units. Memory unit 194 and/or storage unit 195, for example, may store data processed by vehicle 100.

In some demonstrative embodiments, radar 102 may include a radar processor 134 configured to process radar information of radar 102 and/or to control one or more operations of radar 102, e.g., as described below.

In some demonstrative embodiments, radar processor 134 may include, or may be implemented, partially or entirely, by circuitry and/or logic, e.g., one or more processors including circuitry and/or logic, memory circuitry and/or logic. Additionally or alternatively, one or more functionalities of radar processor 134 may be implemented by logic, which may be executed by a machine and/or one or more processors, e.g., as described below.

In one example, radar processor 134 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other embodiments, radar processor 134 may be implemented by one or more additional or alternative elements of vehicle 100.

In some demonstrative embodiments, at least part of the functionality of radar processor 134 may be implemented as part of system controller 124.

In other embodiments, the functionality of radar processor 134 may be implemented as part of any other element of radar 102 and/or vehicle 100.

In other embodiments, radar processor 134 may be implemented, as a separate part of, or as part of any other element of radar 102 and/or vehicle 100.

In some demonstrative embodiments, radar 102 may include a plurality of signal emitters to emit and/or transmit a plurality of emitted signals, and a plurality of signal detectors to detect, sense, and/or receive a plurality of detected signals.

In some demonstrative embodiments, radar may be configured to utilize radar signals, which may be communicate by a plurality of antennas, e.g., as described below.

In other embodiments, radar 102 may be configured to communicate the radar signals in the form of any other signals, e.g., wireless signals, for example, light signals, acoustic signals, and the like. In one example, radar 102 may be configured to utilize a plurality of acoustic transducers, for example, a speaker array, and a plurality of acoustic sensors, for example, a microphone array, for example, in order to achieve the functionality of the plurality of "antennas".

In some demonstrative embodiments, radar 102 may include a plurality of Transmit (Tx) antennas 107 configured to transmit Tx radar signals 127, e.g., as described below.

In some demonstrative embodiments, radar 102 may include a plurality of Receive (Rx) antennas 109 configured to receive Rx radar signals 129, for example, based on the Tx radar signals 127, e.g., as described below.

In one example, antenna elements 107 and/or 109 may include or may be part of any type of antennas suitable for transmitting and/or receiving radar signals. For example, antenna elements 107 and/or 109 may be implemented as part of any suitable configuration, structure and/or arrangement of one or more antenna elements, components, units, assemblies and/or arrays. For example, antenna elements 107 and/or 109 may be implemented as part of a phased array antenna, a multiple element antenna, a set of switched beam antennas, and/or the like. In some embodiments, antenna elements 107 and/or 109 may be implemented to support transmit and receive functionalities using separate transmit and receive antenna elements. In some embodiments, antenna elements 107 and/or 109 may be implemented to support transmit and receive functionalities using common and/or integrated transmit/receive elements.

Some demonstrative embodiments described herein may be implemented to measure details of an environment in a spatial domain, a time domain and/or a velocity domain. For example, these embodiments may be implemented to measure the details of the environment with high resolution, for example, while utilizing radio technology, e.g., in a millimeter wave (mmwave) frequency band and/or sub-terahertz (THz) frequency band. For example, this radio technology may be leveraged by deploying radar technologies in diverse domains, e.g., autonomous transportation, industrial monitoring, security, health, and/or any other additional or alternative domains.

In some demonstrative embodiments, radar 102 may be configured to determine radar perception data representing semantic information of an environment of radar 102, for example, an environment of vehicle 100, e.g., as described below.

In some demonstrative embodiments, the radar perception data may include, for example, an object classification, an object range, an object directionality, an object speed, an object size, an object mapping on a map, a drivable path mapping, a hazardous object mapping, and/or any other additional or alternative parameters, data, and/or information with respect to the environment and/or objects, e.g., as described below.

In some demonstrative embodiments, radar 102 may be configured to implement and/or support a radar architecture including a radar digital backend architecture for determining the radar perception data, and an adaptive feedback controller to control a reconfigurable radio, for example, based on the radar perception data, e.g., as described below.

Some demonstrative embodiments are described below with respect to reconfiguring one or more parameters of a reconfigurable radio of radar 102. In other embodiments, parameters of one or more additional or alternative elements of radar 102 may be reconfigured, e.g., according to a technology being implemented. In one example, a radome and/or a lens may be reconfigured, for example, for a LiDAR system.

In some demonstrative embodiments, the radar architecture may be configured to utilize an efficient and versatile computation block, a control block with a reconfigurable radio front-end, and/or a neural-network based unified artificial intelligence engine, e.g., as described below.

In some demonstrative embodiments, the radar architecture may be trained, for example, to support a wide range of applications, for example, with a minimal need of redesign of hardware and/or software components of the radar architecture, for example, utilizing one or more end-to-end training methods.

In some demonstrative embodiments, radar 102 may include a reconfigurable radio 110, e.g., as described below.

In some demonstrative embodiments, reconfigurable radio 110 may be configured, for example, based on a plurality of reconfigurable radio parameters 152, to transmit a plurality of Tx radar signals 127 via the plurality of Tx antennas 107, e.g., as described below.

In some demonstrative embodiments, reconfigurable radio 110 may be configured, for example, based on the plurality of reconfigurable radio parameters 152, to receive and process a plurality of Rx radar signals 129 via the plurality of Rx antennas 109, for example, based on the plurality of Tx radar signals 127, e.g., as described below.

In some demonstrative embodiments, reconfigurable radio 110 may be configured, for example, based on the plurality of reconfigurable radio parameters 152, to provide digital radar samples 112, for example, based on the Rx radar signals 129, e.g., as described below.

In some demonstrative embodiments, digital radar samples 112 may include in-phase (I) and quadrature-phase (Q) (I/Q) digital samples, for example, based on the Rx radar signals 129, e.g., as described below. In other embodiments, digital radar samples 112 may include and/or may be represented by any other type of digital samples and/or format.

In some demonstrative embodiments, radar 102 may include a radar perception processor 130 configured to generate radar perception data 132, for example, based on the digital radar samples 112, e.g., as described below.

In some demonstrative embodiments, the radar perception data 132 may represent semantic information of an environment of the radar 102, for example, an environment of vehicle 100, e.g., as described below.

In some demonstrative embodiments, radar perception processor 130 may include an Artificial Intelligence (AI) engine trainable according to the digital radar samples 112, e.g., as described below.

In some demonstrative embodiments, radar 102 may include a feedback controller 150 configured to configure the plurality of reconfigurable radio parameters 152, for example, based on the radar perception data 132, e.g., as described below.

In some demonstrative embodiments, feedback controller 150 may be configured to feedback the reconfigurable radio parameters 152 to the reconfigurable radio 110, e.g., as described below.

In some demonstrative embodiments, feedback controller 150 may be configured to configure the plurality of reconfigurable radio parameters 152, for example, based on the digital radar samples 112, e.g., as described below.

In some demonstrative embodiments, feedback controller 150 may be configured to configure the plurality of reconfigurable radio parameters 152 based on any other additional or alternative input from one or more additional or alternative elements of vehicle 100.

In some demonstrative embodiments, feedback controller 150 may include an AI engine trainable, for example, according to the radar perception data 132, the digital radar samples 112, and/or intermediate radar processing data 137 from the radar perception processor 130, e.g., as described below.

In some demonstrative embodiments, radar perception processor 130 and/or feedback controller 150 may include, or may be implemented, partially or entirely, by circuitry and/or logic, e.g., one or more processors including circuitry and/or logic, memory circuitry and/or logic. Additionally or alternatively, one or more functionalities of radar perception processor 130 and/or feedback controller 150 may be implemented by logic, which may be executed by a machine and/or one or more processors, e.g., as described below.

In one example, radar perception processor 130 and/or feedback controller 150 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other embodiments, radar perception processor 130 and/or feedback controller 150 may be implemented by one or more additional or alternative elements of vehicle 100.

In some demonstrative embodiments, at least part of the functionality of radar perception processor 130 and/or feedback controller 150 may be implemented as part of system controller 124.

In other embodiments, the functionality of radar perception processor 130 and/or feedback controller 150 may be implemented as part of any other element of radar 102 and/or vehicle 100.

In some demonstrative embodiments, radar processor 134 may be configured to provide mapping information of the environment, for example, based on the radar perception data 132, e.g., as described below. In one example, radar processor 134 may be configured to provide to system controller 124 radar-based information, which may include and/or may be based on the mapping information of the environment.

In some demonstrative embodiments, radar perception processor 130 may be configured to provide a reliability indicator to indicate a reliability of the radar perception data 132, as described below. For example, radar perception processor 130 may be configured to provide the reliability indicator as part of radar perception data 132 and/or as a separate and/or dedicated output.

In some demonstrative embodiments, feedback controller 150 may be configured to configure the plurality of reconfigurable radio parameters 152, for example, based on the reliability indicator from radar perception processor 130, e.g., as described below.

In some demonstrative embodiments, feedback controller 150 may be configured to configure the plurality of reconfigurable radio parameters 152, for example, based on the digital radar samples 112, e.g., as described below.

In some demonstrative embodiments, feedback controller 150 may be configured to adaptively configure the plurality of reconfigurable radio parameters 152 in real time, for example, based on previous radar perception data corresponding to previously processed digital radar samples, e.g., as described below. For example, feedback controller 150 may be configured to temporarily store the previously processed digital radar samples, and to retrieve the previously processed digital radar samples for processing together with current radar perception data received from radar perception processor 130, e.g., in real time.

In some demonstrative embodiments, the plurality of reconfigurable radio parameters 152 may include a beamforming parameter, a beam-nulling parameter, a polarization type parameter, a frame time of the Tx radar signals 127, a chirp time of the Tx radar signals 127, digital modulation characteristics of the Tx radar signals 127, a radiation pattern of the Tx radar signals 127, a polarization type of the Tx radar signals 127, a coding sequence of the Tx radar signals 127, a center frequency of the Tx radar signals 127, and/or any other additional or alternative parameters.

In some demonstrative embodiments, the reconfigurable radio 110 may include a plurality of reconfigurable Radio RF Tx chains 117 configured to transmit the Tx radar signals 127 via the plurality of Tx antennas 107, for example, based on the plurality of reconfigurable radio parameters 152, e.g., as described below.

In some demonstrative embodiments, the reconfigurable radio 110 may include a plurality of reconfigurable RF Rx chains 119 configured to process the Rx radar signals 129 received via the plurality of Rx antennas 109, for example, based on the plurality of reconfigurable radio parameters 152, e.g., as described below.

In some demonstrative embodiments, the reconfigurable radio 110 may include a reconfigurable RF front-end 116, which may be configurable, for example, according to the plurality of reconfigurable radio parameters 152, to convert the Rx radar signals 129 into the digital radar samples 112; and/or to generate the Tx radar signals 127, e.g., as described below.

In some demonstrative embodiments, radar perception processor 130 may include a range estimator 135 configured to process the digital radar samples 112 and to provide range information including range estimates 131 of objects in the environment, e.g., as described below.

In some demonstrative embodiments, radar perception processor 130 may include a transformer 136 configured to transform the range estimates 131 into Range-Doppler estimates 139 of the objects, e.g., as described below.

In some demonstrative embodiments, radar perception processor 130 may include a perception data generator 138 configured to generate the radar perception data 132 representing the semantic information of the environment of the radar 102, for example, based on the Range-Doppler estimates 139 of the objects, e.g., as described below.

In some demonstrative embodiments, the digital radar samples 112 may include a plurality of streams of digital radar samples corresponding to the plurality of Rx antennas 109, respectively, e.g., as described below.

In some demonstrative embodiments, range estimator 135 may include a plurality of pre-processing filters configured to determine a respective plurality of initial range estimates, for example, based on the plurality of streams of digital radar samples, e.g., as described below.

In some demonstrative embodiments, the plurality of pre-processing filters may include a plurality of pre-processing AI engines, e.g., as described below.

In some demonstrative embodiments, a pre-processing AI engine of the plurality of pre-processing AI engines may be trainable, for example, based on a respective stream of digital radar samples of the plurality of streams of digital radar samples 112, e.g., as described below.

In some demonstrative embodiments, range estimator 135 may include a plurality of range estimation generators to generate the range information 131, for example, by applying to the initial range estimates a side-lobe suppression mechanism, an interference suppression mechanism, and/or any other mechanism, e.g., as described below.

In some demonstrative embodiments, the plurality of range estimation generators may include a plurality of range-estimation AI engines, e.g., as described below.

In some demonstrative embodiments, a range-estimation AI engine of the plurality of range-estimation AI engines may be trainable, for example, based on a respective initial range estimate of the plurality of initial range estimates, e.g., as described below.

In some demonstrative embodiments, the perception data generator 138 may include a Hybrid Convolutional Neural Network (HCNN), which may be configured, for example, to determine semantic and spatial information based on the Range-Doppler estimates 139 of the objects, e.g., as described below.

In some demonstrative embodiments, the perception data generator 138 may include a plurality of parallel Fully-Connected (FC) neural network branches to generate the radar perception data 132, for example, based on the semantic and spatial information from the HCNN, e.g., as described below.

In some demonstrative embodiments, an FC neural network branch of the plurality of FC neural network branches may be configured to generate a perception output of the radar perception data 132, for example, based on the semantic and spatial information from the HCNN, e.g., as described below.

In some demonstrative embodiments, the FC neural network branch may be configured to provide a reliability indicator corresponding to an uncertainty of the perception output provided by the FC neural network branch, e.g., as described below.

In some demonstrative embodiments, the radar perception data 132 may include, for example, one or more of an object classification, a reliability of the object classification, an object range, a reliability of the object range, an object directionality, a reliability of the object directionality, an object speed, a reliability of the object speed, an object size, a reliability of the object size, an object mapping on a map, a reliability of the object mapping on the map, a drivable path mapping, a reliability of the drivable path mapping, a hazardous object mapping, a reliability of the hazardous object mapping, and/or any other additional or alternative parameter and/or information with respect to the environment and/or objects in the environment.

In some demonstrative embodiments, radar 102 may be configured to automatically extract radar perception data 132 from the surrounding environment, and to provide a reliability indicator for a reliability of the radar perception data 132, for example, by analyzing features directly extracted from the I/Q digital samples, data after cross-correlation, and/or any other information, e.g., as described below.

In some demonstrative embodiments, radar 102 may be configured to adaptively change a transmitted waveform, a directivity, a power and/or processing algorithms of radar 102, for example, to maximize an accuracy of radar perception data 132, e.g., as described below.

In some demonstrative embodiments, implementing one or more conventional radar methods to measure an environment, to process, and/or to interpret radar data for an intended application may have one or more technical inefficiencies, disadvantages and/or problems in one or more use cases and/or scenarios, e.g., as described below.

In one example, conventional radar methods may require an a-priori engineering, designing and configuring of one or more aspects of a radar system. Such aspects of the radar system may include, for example, a transmitted waveform, a space-time adaptive processing mechanism, one or more processing algorithms for the transmitted waveform and/or the space-time adaptive processing mechanism, a feedback control loop, e.g., to optimize a Signal To Interference and Noise Ratio (SINR), and/or any other aspects. Consequently, such conventional radar methods may only be used for particular applications. For example, new applications may necessitate a re-design of the radar system and/or one or more components of the radar system.

For example, some conventional radar methods may include signal processing and control functions, which may be realized by specifically designed digital signal processing algorithms.

For example, an in-factory and periodic online calibration may be required for some processing stages, for example, an impairment compensation, which may result in an increased manufacturing cost and/or an increased downtime of a radar system.

For example, a complexity and cost of the one or more conventional radar methods may become infeasible, for example, as a resolution requirement increases. For example, a radar front end may generate an enormous amount of data, for example, as a number of transmitter and receiver chains increases. The enormous amount of data may make a conventional digital signal processing approach infeasible under many applications to handle the data, for example, using a reasonable power consumption and without a large processing delay. In one example, signal processing of a high-resolution imaging radar may require a computation capability of several hundreds of Giga Floating Point Operations Per Second (GFLOPs).

In some demonstrative embodiments, radar 102 may be configured to support and/or provide one or technical advantages and/or improvements over the conventional radar methods, architectures and/or systems, e.g., as described below.

In some demonstrative embodiments, radar 102 may be configured to support a unified and flexible architecture, e.g., as described below.

In some demonstrative embodiments, radar 102 may be configured to support a processing pipeline, which may be based on a hybrid architecture including one or more AI engines, e.g., neural networks, one or more trainable signal processing blocks, and/or one or more optional hardcoded signal processing blocks, for example, to output application-specific information based on raw input from a radar frontend, for example, radar digital samples 112 from reconfigurable RF front-end 116.

In some demonstrative embodiments, radar 102 may be configured to implement an architecture, which may even a void a need for specifically engineered and/or fine-tuned signal processing blocks, e.g., for each application, waveform, and/or radio frontend configuration, e.g., as described below.

In one example, radar 102 may utilize a hybrid architecture including a Doppler processing block implemented by an FFT, e.g., as part of transformer 134, and one or more AI layers, e.g., implemented by perception data generator 138. According to this example, an RF impairments correction and/or a matched filter operation may be performed by the AI layers, which may provide a clear output of range bins; the Doppler processing may be performed by an FFT followed by an angular processing and detection of objects, which may be implemented by additional AI layers, e.g., as described below.

In some demonstrative embodiments, radar 102 may utilize an architecture, which may be retrained and scaled relatively easily, for example, while utilizing different configurations of reconfigurable radio 110, for example, according to requirements of each application.

In some demonstrative embodiments, radar 102 may utilize a highly flexible architecture, e.g., as described herein, which may support one or more use cases of automotive scenarios, and/or one or more other use cases, e.g., non-vehicular scenarios, for example, even without an extensive redesign of a processing pipeline and/or components of the architecture.

In some demonstrative embodiments, radar 102 may utilize an architecture, e.g., as described herein, which may provide increased performance, e.g., with a reduced computational cost. For example, the architecture of radar 102, e.g., as described herein, may reduce a computation complexity and/or memory requirement, for example, by generating radar perception data 132, for example, directly from the digital radar samples 112, e.g., the I/Q samples of the radar frontend 116, for example, even without explicitly calculating and/or buffering intermediate 4D voxel or point clouds, e.g., as described below.

In one example, multi-task neural architectures with shared computation across tasks, e.g., object classification and/or orientation estimation, may improve an overall performance of the tasks, and/or may reduce a computation complexity.

In some demonstrative embodiments, the architecture of radar 102, e.g., as described herein, may support a computation sharing, which may be extended to an earlier stage of a radar processing pipeline, e.g., up to a raw Analog to Digital Convertor (ADC) output, e.g., from front end 116.

In some demonstrative embodiments, the architecture of radar 102, e.g., as described herein, may support a radar processing pipeline, which may not require to from and/or buffer intermediate output, and, accordingly, may reduce the computation complexity and/or the memory requirement. For example, the architecture of radar 102, e.g., as described herein, may support achieving a complexity, for example, of less than 1 TFLOPS and/or any other higher/lower value, e.g., from end-to-end.

In some demonstrative embodiments, the architecture of radar 102, e.g., as described herein, may support utilizing one or more dedicated signal processing blocks, for example, instead of AI engines, e.g., neural network layers.

In some demonstrative embodiments, radar 102 may be configured to support a combination of radar perception processor 130 and feedback controller 150, for example, to provide a RL based feedback control engine, which may be, for example, optimized to generate radar perception data 132 with low latency.

In some demonstrative embodiments, the RL based feedback control engine may include two AI engines, for example, forward and feedback AI engines, e.g., the radar perception processor 130 and feedback controller 150, which may provide learning and cognitive functionalities of radar 102. These functionalities may mitigate interference, may improve SINR, and/or may increase, e.g., optimize, a perception accuracy of radar 102.

In some demonstrative embodiments, the architecture of radar 102, e.g., as described herein, may support a reduced latency of feedback, e.g., according to a timescale at an order of 10ths of milliseconds per frame update.

Figure 2:
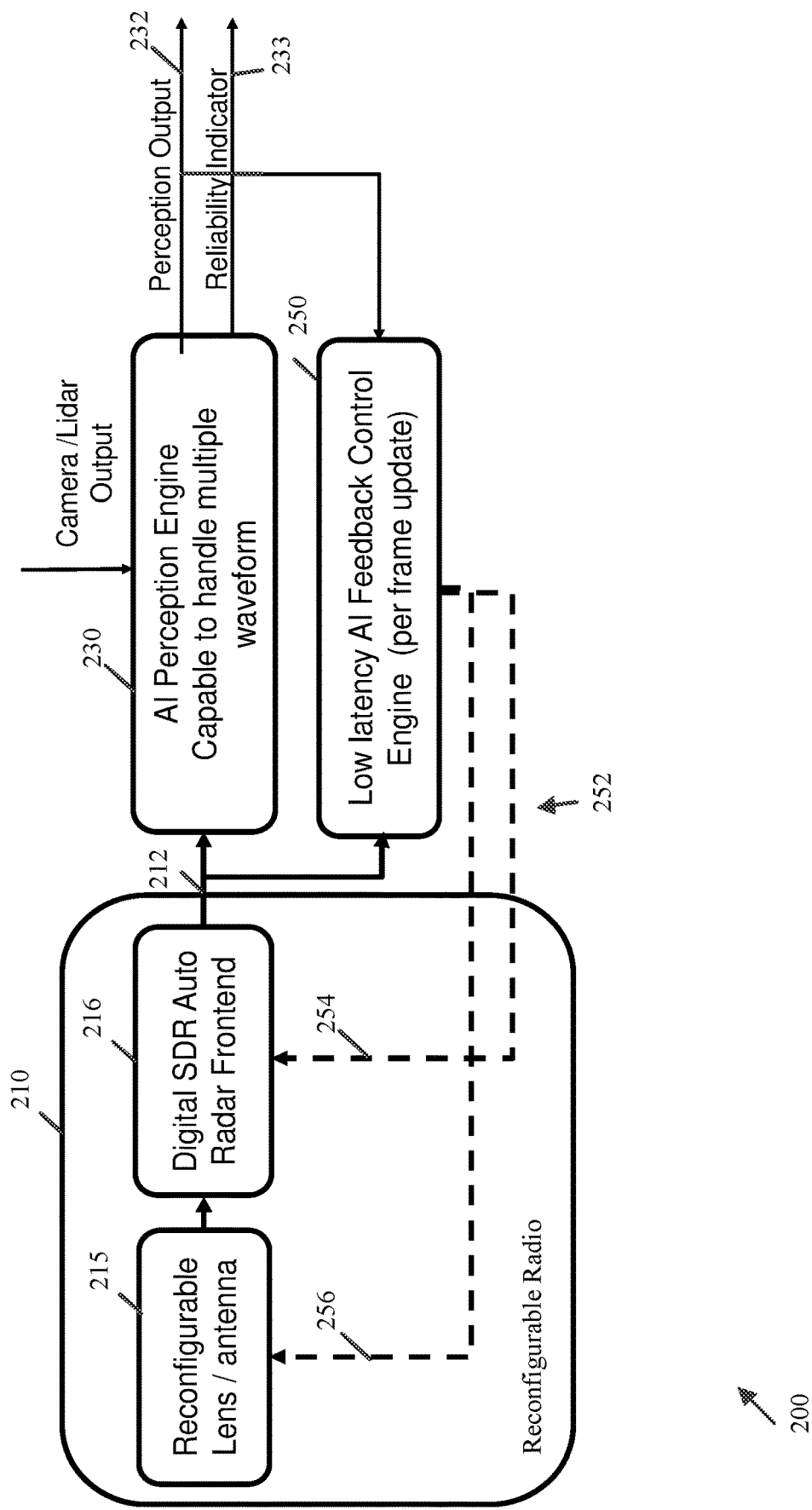
FIG. 2 is a schematic illustration of a radar architecture, in accordance with some demonstrative embodiments

Reference is made to FIG. 2, which schematically illustrates a radar architecture 200, in accordance with some demonstrative embodiments. For example, radar 102 (FIG. 1) may include, implement, and/or perform the functionality of, one or more components of radar architecture 200.

In some demonstrative embodiments, as shown in FIG. 2, radar architecture 200 may include a reconfigurable radio 210, which may be configured, for example, based on a plurality of reconfigurable radio parameters 252, to provide digital radar samples 212 based on Rx radar signals, e.g., Rx signals 129 (FIG. 1), received by a reconfigurable antenna 215. For example, reconfigurable radio 110 (FIG. 1) may include, and/or may perform the functionality of, the role of, and/or one or more operations of, reconfigurable radio 210.

In some demonstrative embodiments, as shown in FIG. 2, reconfigurable radio 210 may include a digital front-end 216, e.g., a digital Software Defined Radio (SDR) radar front-end, and/or any other type of configurable or non-configurable front end.

In some demonstrative embodiments, as shown in FIG. 2, radar architecture 200 may include a radar perception processor 230 to generate radar perception data 232, for example, based on the digital radar samples 212, e.g., as described below.

In some demonstrative embodiments, radar perception processor 230 may be configured to generate radar perception data 232 based on any other information, including, for example, a camera-LiDAR output, HD-map information, and/or any other input.

In some demonstrative embodiments, as shown in FIG. 2, radar perception processor 230 may provide a reliability indicator 233 to indicate a reliability of the radar perception data 232, e.g., as described below.

In some demonstrative embodiments, radar perception processor 230 may include an AI perception engine, which may be trainable according to the digital radar samples 212 and/or any other training information, e.g., as described below.

In some demonstrative embodiments, as shown in FIG. 2, radar architecture 200 may include a feedback controller 250 configured to configure the plurality of reconfigurable radio parameters 252, for example, based on the radar perception data 232, and to feedback the reconfigurable radio parameters 252 to the reconfigurable radio 210, e.g., as described below.

In some demonstrative embodiments, as shown in FIG. 2, feedback controller 250 may include a low latency AI feedback control engine. In other embodiments, feedback controller 250 may include and/or may be implemented based on any other AI-based or non-AI-based technology and/or scheme.

In some demonstrative embodiments, as shown in FIG. 2, feedback controller 250 may configure the plurality of reconfigurable radio parameters 252, for example, based on the reliability indicator 233 and the digital radar samples 212, e.g., as described below.

In some demonstrative embodiments, as shown in FIG. 2, reconfigurable radio parameters 252 may include front-end parameters 254 to configure digital front-end 216. For example, the front-end parameters may be provided as a waveform adaptation output to digital radar frontend 216, for example, including bandwidth parameters, precoder parameters, polarization parameters, and/or any other front-end parameters.

In some demonstrative embodiments, as shown in FIG. 2, reconfigurable radio parameters 252 may include antenna parameters 256 to configure reconfigurable antenna 215. For example, the antenna parameters may be configured to command and/or adapt an antenna array, and may include, for example, beamforming parameters, beam-nulling parameters, polarization change parameters, and/or any other antenna parameters.

In some demonstrative embodiments, radar architecture 200 may provide a high degree of reconfigurability, for example, when utilizing the building blocks of radar architecture 200.

In some demonstrative embodiments, reconfigurable antenna 215 may include one or more, e.g., some or all, reconfigurable radio-frequency components, and/or one or more antennas including antenna arrays. For example, the antennas in the radio frontend may be reconfigured and/or adapted to generate a wide range of phases, and/or magnitude patterns, e.g., a radial range and/or angular dimensions. This reconfiguration of the frontend may be utilized, for example, to dynamically adapt to wide variability in the environment, and/or to mitigate an interference from other radars and/or communication devices.

In some demonstrative embodiments, digital front-end 216 may include a fully SDR-based radar frontend configured to operate substantially over an entire spectrum, e.g., as permitted by regulations.

In some demonstrative embodiments, digital front-end 216 may be configured to transmit and receive arbitrary waveforms, and/or to convert received electromagnetic wave signals into digital signals 212.

In other embodiments, digital front-end 216 may be configured according to any other front end technology.

In some demonstrative embodiments, radar perception processor 230 may include a flexible general-purpose AI processing engine configured for generating perception output 232, and the associated reliability indicator 232, for example, from digital signals 212, e.g., as provided by the radar receivers ADC output.

In some demonstrative embodiments, radar perception processor 230 may be configured to automatically extract the semantic information 232 of a surrounding environment, and to provide the reliability indicator 233 for its reliability. In one example, the semantic information and/or the reliability indicator may be determined by analyzing features, for example, directly extracted from I/Q output or data after cross-correlation, e.g., based on digital radar samples 212.

In some demonstrative embodiments, radar perception processor 230 may be configured to perform one or more operations to provide the semantic information 232 and/or the reliability indicator 233, for example, with respect to an automotive domain, for example, detecting objects, e.g., a car, a pedestrian, a bike and the like; localizing the objects, their classes, and/or orientations in a scene; providing a map of surrounding environment with semantically significant information; providing a map of hazardous objects; providing a map of drivable path, and/or any other operation.

In some demonstrative embodiments, radar perception processor 230 may be configured to perform one or more operations to provide the semantic information 232 and/or the reliability indicator 233, with respect to any other additional or alternative vehicular or non-vehicular environment and/or implementation.

In some demonstrative embodiments, feedback controller 250 may utilize a flexible processing engine, for example, to maximize an accuracy of radar perception data 232.

In some demonstrative embodiments, feedback controller 250 may be configured to adaptively change the reconfigurable radio parameters 252, for example, to affect a transmitted waveform, antenna parameters and/or the like, e.g., as described below.

In some demonstrative embodiments, feedback controller 250 may include a Low-latency AI processing engine configured for controlling and reprogramming the reconfigurable components of reconfigurable radio 210, e.g., as described below.

In some demonstrative embodiments, feedback controller 250 may include a feedback low-latency AI engine, which may be configured and trained to take inputs from a final layer of the AI processing engine, e.g., radar perception processor 230, intermediate layers, and/or from an ADC output, e.g., radar digital samples 212. In some demonstrative embodiments, feedback controller 250 may include a deep neural network and/or a reinforcement learning network, e.g., a Q-learning algorithm, a Deep Q-learning Network (DQN), a State-action-reward-state-action (SARSA), and/or the like, which may utilize, for example, trained weights configured to generate transmit parameters for a next frame, for example, in order to adapt, e.g., in real-time, to changes in the environment.

For example, the changes in the environment may include changes in a scene to be sensed, changes in the weather conditions, and/or changes in any other parameters affecting electronic properties of radio components of radio 210.

Figure 3:
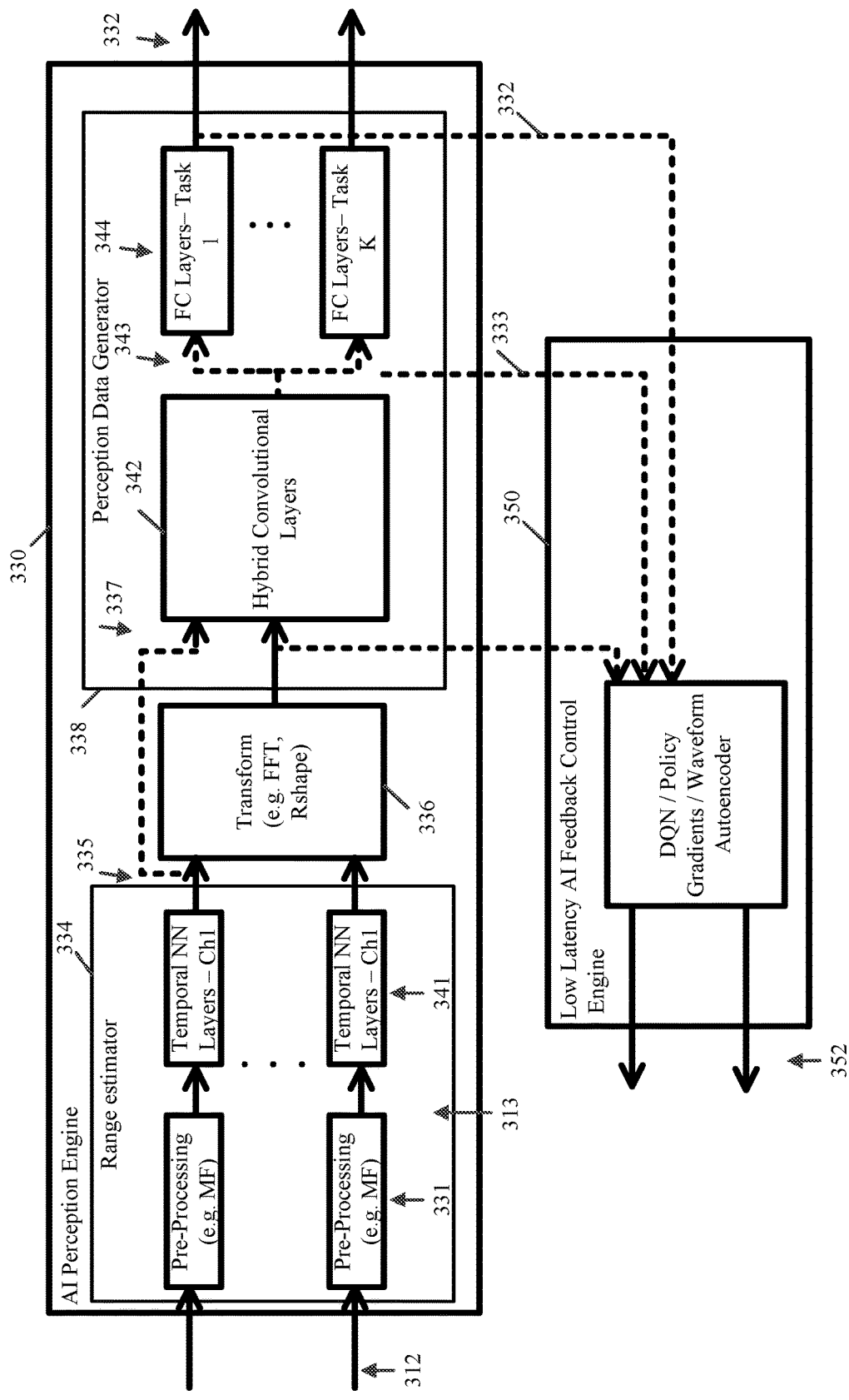
FIG. 3 is a schematic illustration of components of a radar architecture, in accordance with some demonstrative embodiments

Reference is made to FIG. 3, which schematically illustrates components of a radar architecture 300, in accordance with some demonstrative embodiments. For example, radar 102 (FIG. 1) may include, may perform one or more operations of, and/or may perform one or more functionalities of, one or more components of radar architecture 300.

Some demonstrative embodiments are described herein with respect to radar architecture including one or more trainable blocks in a particular sequential order, e.g., as described below and shown in FIG. 3. However, other embodiments may be implemented with any other sequential order of the trainable blocks. For example, one or more blocks, which may perform a particular functionality, e.g., a range processing, a Doppler processing, an AoA processing and the like, may be permuted and their sequence may be variable.

In some demonstrative embodiments, as shown in FIG. 3, radar architecture 300 may include a radar perception processor 330 to generate radar perception data 332 based on digital radar samples 312. For example, radar perception processor 130 (FIG. 1) may include and/or may perform the functionality of, the role of, and/or one or more operations of, radar perception processor 330.

In some demonstrative embodiments, as shown in FIG. 3, radar perception processor 330 may include an AI perception engine, which may be trainable according to the digital radar samples 312.

In some demonstrative embodiments, as shown in FIG. 3, radar perception processor 330 may include a range estimator 334 configured to process the digital radar samples 312 and to provide range information including range estimates 335 of objects in an environment.

In some demonstrative embodiments, as shown in FIG. 3, range estimator 334 may include a plurality of pre-processing filters 331 configured to determine a respective plurality of initial range estimates 313, for example, based on a plurality of streams of digital radar samples 312.

In some demonstrative embodiments, the plurality of pre-processing filters 331 may include a plurality of pre-processing AI engines, e.g., as described below.

In some demonstrative embodiments, as shown in FIG. 3, range estimator 334 may include a plurality of range estimation generators 341 to generate the range information 335, for example, by applying to the initial range estimates 313 one or more of a side-lobe suppression mechanism, and/or an interference suppression mechanism, and/or any other mechanism, e.g., as described below.

In some demonstrative embodiments, as shown in FIG. 3, the plurality of range estimation generators 341 may implement a plurality of range-estimation AI engines, e.g., as described below.

In some demonstrative embodiments, as shown in FIG. 3, radar perception processor 330 may include a transformer 336 configured to transform the range estimates 335 into Range-Doppler estimates 337 of the objects, e.g., as described below.

In some demonstrative embodiments, as shown in FIG. 3, radar perception processor 330 may include a perception data generator 338 configured to generate the radar perception data 332, for example, based on the Range-Doppler estimates 337 of the objects, e.g., as described below.

In some demonstrative embodiments, as shown in FIG. 3, the perception data generator 338 may include an HCNN 342 configured to determine semantic and spatial information 343 based on the Range-Doppler estimates 337 of the objects, e.g., as described below.

In some demonstrative embodiments, as shown in FIG. 3, the perception data generator 338 may include a plurality of, e.g., parallel, FC neural network branches 344, which may be configured to generate the radar perception data 332, e.g., as described below.

In some demonstrative embodiments, as shown in FIG. 3, an FC neural network branch 344 may be configured to generate a perception output 332 of the radar perception data 332, for example, based on the semantic and spatial information 343 from the HCNN 342, e.g., as described below.

In some demonstrative embodiments, the FC neural network branch 344 may be configured to provide a reliability indicator corresponding to an uncertainty of the perception output 332, e.g., as described below.

In some demonstrative embodiments, radar perception processor 330 may include an AI based 4D radar perception engine. The AI-based pipeline of radar perception processor 330 may replace one or more blocks, e.g., some or even all blocks, of a conventional radar signal processing pipeline, for example, with corresponding trainable neural networks, e.g., as described above.

In some demonstrative embodiments, the plurality of pre-processing filters 331 may include a preprocessing layer, which may be applied at an input of the processing pipeline, e.g., the input of digital samples 312.

In some demonstrative embodiments, digital radar samples 312 may include I/Q samples from ADCs for respective receiver chains.

In some demonstrative embodiments, the pre-processing layer may include a neural network for a data stream of I/Q samples from a receiver chain. In one example, the pre-processing layer may include a neural network implemented by each of pre-processing filters 331, for example, for a data stream of I/Q samples from a respective receiver chain. In one example, the neural networks implemented by each of pre-processing filters 331 may utilize, for example, identical weights, which may be determined, for example, during a training time.

In some demonstrative embodiments, each of the preprocessing layers may be trained to provide an initial range profile, e.g., including initial range estimates 313.

In some demonstrative embodiments, range estimation generators 341 may be implemented utilizing a plurality of temporal neural network layers, which may process the initial range profile. For example, the temporal neural network layers may be concatenated, and may be configured to process complex-valued data in a temporal domain, for example, to approximate adaptive filtering operations.

In one example, the plurality of temporal neural network layers may include one or more building blocks from a Recurrent Neural Network (RNN), a Long short-term memory (LSTM), a Temporal Convolutional Network (TCN), a Transformer architecture, and/or any other architectures and/or networks.

In some demonstrative embodiments, the plurality of temporal neural networks layers may improve range estimates 313, for example, by applying side-lobes suppression, interference mitigation, and/or any other additional or alternative mechanism.

In some demonstrative embodiments, the range information 335, which may include the output from each of the preceding temporal pipelines, may be transformed and/or reshaped, for example, to be fed into following layers of processing, for example, to form a data structure, which may be compatible with a convolutional operation of the following layers of processing, e.g., as described below.

In some demonstrative embodiments, transformer 336 may receive the range information 335 and may perform a transformation operation, for example, including trainable Doppler processing followed by a rearrangement for a following AOA estimate, and/or any other transformation operations.

In some demonstrative embodiments, transformer 336 may utilize a unit function as an activation function, for example, to maintain a linearity property of an input-output, e.g., as follows:

$$Y_{out} = DX_{in} \qquad (1)$$

wherein D may be initialized, for example, with a DFT coefficient, and tuned during a training process.

In some demonstrative embodiments, the Range-Doppler estimates 337 may provide a full Range-Doppler estimate of an object (also referred to as "target") scene. For example, the Range-Doppler estimates 337 may be based on a Doppler FFT, and a reshape operation, to rearrange the Range-Doppler estimates 337 into a Range-Doppler-Antenna order.

In some demonstrative embodiments, HCNN 342 may include a combination of a plurality of convolutional neural layers, and signal processing blocks, e.g., including trainable and/or fixed processing blocks, which may be concatenated, for example, to form HCNN 342, e.g., as described below.

Figure 4:
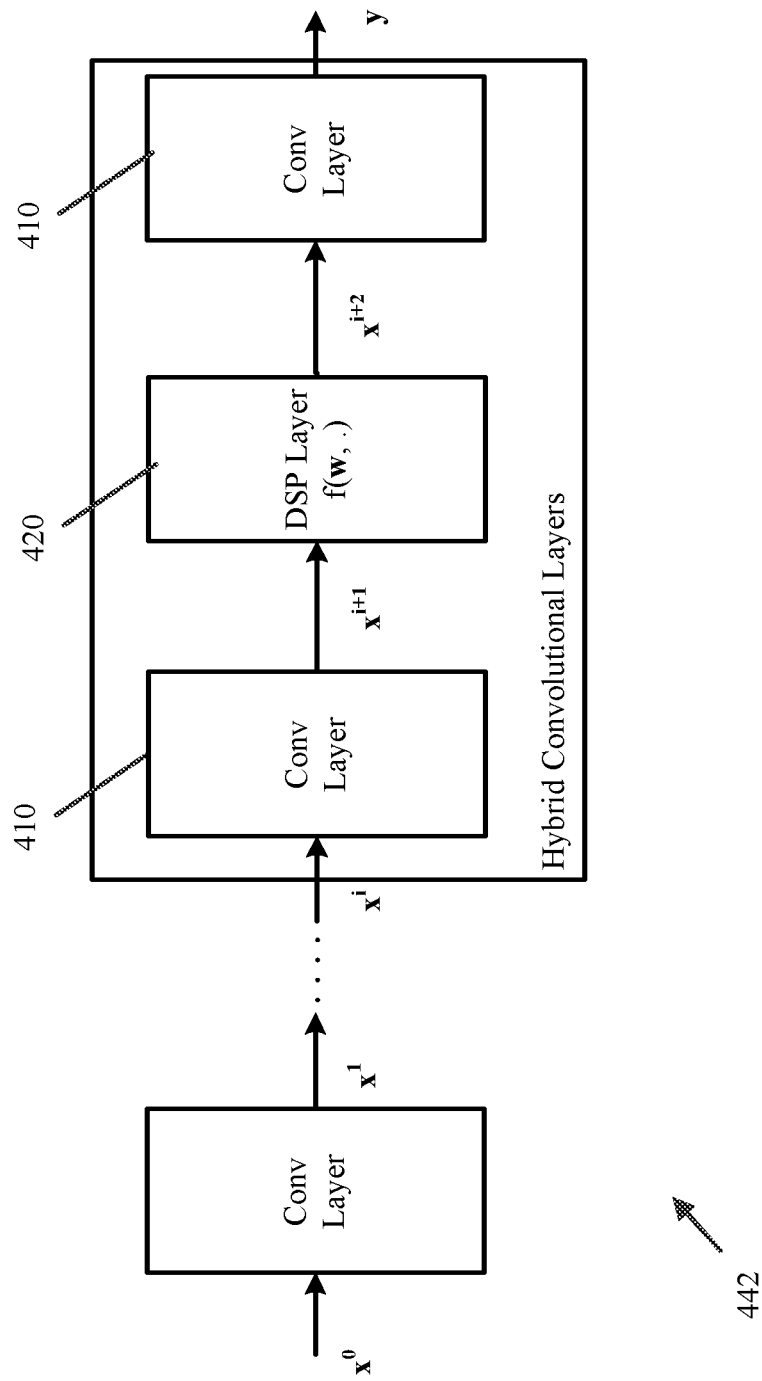
FIG. 4 is a schematic illustration of a Hybrid Convolutional Neural Network (HCNN), in accordance with some demonstrative embodiments.

Reference is made to FIG. 4, which schematically illustrates an HCNN 442, in accordance with some demonstrative embodiments. For example, HCNN 342 (FIG. 3) may include and/or perform the functionality of, the role of, and/or one or more operations of, HCNN 442.

In some demonstrative embodiments, as shown in FIG. 4, HCNN 442 may include a combination of plurality of convolutional neural layers 410, and a plurality of signal processing blocks 420, e.g., including trainable processing blocks, fixed processing blocks, and/or a combination thereof. which may be concatenated to form HCNN 442.

In some demonstrative embodiments, a dimensionality of a convolutional layer 410, and/or a number of convolutional neural layers 410 may be determined and/or configured, for example, based on an application of HCNN 442.

In some demonstrative embodiments, parameters of the signal processing blocks 410, and/or weights of convolutional layers 420 may be trained.

In some demonstrative embodiments, an input-output relation of a trainable DSP layer 420 may be configured, e.g., as follows:

$$x_{out}=f(w,x_{in}) \qquad (2)$$

wherein f(w,) denotes a signal processing operation, which may be parameterized by a trainable parameter w.

In some demonstrative embodiments, HCNN 442 may extract spatial and semantic features from an output of previous layers, e.g., through training. For example, HCNN 442 may extract one or more parameters with respect to AoA estimation, semantic segmentation, object classification, and/or any other semantic information.

Referring back to FIG. 3, in some demonstrative embodiments, the plurality of parallel FC neural network branches 344 may include a plurality of fully-connected layers including parallel branches, which may be connected to an output of the HCNN 342.

In some demonstrative embodiments, the semantic and spatial information 343 from the HCNN 342 may be broadcasted, e.g., shared, to an input of each of the fully connected branches 344.

In some demonstrative embodiments, a number of FC layers in each branch and/or dimensions of an FC layer may be configured, for example, based on a perception output type to be provided.

In one example, the perception output type may include object classification, object detection, semantic segmentation, instance segmentation, and/or any other type of perception data.

In some demonstrative embodiments, an FC branch 344 may be configured to output an object class, location vector, orientation vector and/or the like, with a reliability indicator corresponding to an uncertainty estimate for each of the outputs.

In another example, an FC branch 344 may be configured to output point cloud and/or associated features, e.g., complex and/or polarimetric reflectivity.

In some demonstrative embodiments, dimensions of FC layers in a FC branch 344 may differ, e.g., in each branch.

In some demonstrative embodiments, as shown in FIG. 3, radar architecture 300 may include a feedback controller 350 configured to configure a plurality of reconfigurable radio parameters 352, for example, based on the radar perception data 332, and to feedback the reconfigurable radio parameters 352 to a reconfigurable radio. For example, feedback controller 150 (FIG. 1) may include and/or may perform the functionality of, the role of, and/or one or more operations of, feedback controller 350.

In some demonstrative embodiments, as shown in FIG. 3, feedback controller 350 may include a low latency AI feedback control engine.

In some demonstrative embodiments, feedback controller 350 may include a low latency AI pipeline for feedback control including, for example, an AI engine with trained weights in a feedback loop, which may be configured to adapt a radar antenna array including a radar transmitter and receivers, e.g., radar antenna array 215 (FIG. 2), for example, to a changing environment.

In some demonstrative embodiments, feedback controller 350 may be based on deep neural network architectures including, for example, a deep reinforcement learning architecture, e.g., a Q-network, a SARSA network, a DQN, a Long Short-Term Memory (LSTM), a gated recurrent neural network, and/or any other neural network.

In some demonstrative embodiments, feedback controller 350 may be trained, for example, according to data from an output layer and/or an intermediate layer of radar perception processor 330, e.g., as described below.

In some demonstrative embodiments, feedback controller 350 may be trained, for example, by defining loss and/or reward functions, for example, based on one or more weight parameters configured to measure a performance of the feedback controller 350.

In some demonstrative embodiments, feedback controller 350 may be trained, for example, based on current and previous outputs of a general-purpose AI radar perception engine classifier, for example, current and previous radar perception data 332, e.g., including an object type, velocity, and/or location of objects, and the like.

In some demonstrative embodiments, feedback controller 350 may be trained, for example, based on current and previous outputs from a radar front-end, e.g., digital radar samples 312, and/or data from one or more intermediate layers of radar perception processor 330, e.g., data after transformation layer 336, and/or any other intermediate layer.

In some demonstrative embodiments, feedback controller 350 may be trained, for example, based on cost and/or loss functions, and/or a reward from the current and previous radar transmit parameters. For example, a prediction of a reconfigurable parameter in a next frame may be determined, for example, based on Bayesian inference-based algorithms and/or the neural network architectures described above.

In some demonstrative embodiments, the reconfigurable radio parameters 352, e.g., the outputs from the trained feedback control AI engine, may include a waveform, a modulation, a center frequency, a bandwidth, a polarization, a beamforming directivity, phase and/or amplitude values, e.g., control signals to the radar frontend, for example, RF lens, antennas, transmitters and receivers, and/or any other additional or alternative parameters.

In some demonstrative embodiments, feedback controller 350 may adaptively change the reconfigurable radio parameters 352, for example, to maximize an accuracy of the radar perception data 332.

In some demonstrative embodiments, feedback controller 350 may adaptively change the reconfigurable radio parameters 352, for example, based on one or more principles and/or conceptions, e.g., as described below. In other embodiments, any other additional or alternative criteria may be utilized.

In one example, feedback controller 350 may be trained with respect to a scene where there is a first car (e.g., a "green car"), for example, ahead at boresight in short range, and a second car, for example, ahead around medium range on to the right side of the road, and where the second car is backing out from a parking space on to the road. According tot his example, the following control logic may be applied during the radar operation to better perceive the scene:

TABLE 1

| Frame # | Perception Output/ Input to the control engine | Example of rule-based control logic | Define sensing indicators for next frame | Action/ Reconfigurable parameters Output of the control engine |
|---|---|---|---|---|
| 1 | Radar perception output (object list, location vector, velocity vector, orientation vector, reliability indicators); | If front green car velocity is within speed limit range and no detections on right side perform same action Elseif there are positive detections on the right side and if the classification list type is car; Update antenna vertical and horizontal field of view (VFOV, HFOV), increase horizontal angular resolution (HRes), reduce maximum range (Rmax) increase range resolution (Rres) and velocity resolution (Vres) | Update HFOV: 180° to 150° VFOV: 30° to 15° HRes: 5° to 4° Rmax: 200 m to 150 m Rres: 80 cm to 30 cm Vres: 0.5 m/s to 0.2 m/s, | Bandwidth (BW), frame time ($T_f$) chirp time ($T_c$) Radiation pattern ($F_n$ ($\theta$, $\phi$), $F_{total}$) |
| 2 | Same as above | If front green car current range is same as previous range observations, Keep current parameters Elseif current range is less than previous range and positive signal in hazard map at 79 GHz scan for frequency and change center frequency (fc) | Update Fc: 79 GHz to 77 GHz | center frequency (Fc) |

In other embodiments, feedback controller 350 may reconfigurable the radio parameters 252, for example, according to any other additional or alternative principles and/or rules.

In some demonstrative embodiments, feedback controller 350 may reconfigure one or more parameters of the reconfigurable radio parameters 352, for example, based on one or more parameters, e.g., sensing indicators, of radar perception data 332, e.g., as follows:

TABLE 2

| Sensing Indicators (SI) | Relation between SI to reconfigurables | Reconfigurable description Comments |
|---|---|---|
| Max unambiguous range (Rmax) | $R_{max} = \dfrac{cT_c}{2}$ | Chirp time (Tc) control input to the RFIC |
| Max radial velocity (Vmax) | $v_{max}^r = \dfrac{\lambda}{4T_c}$ | Chirp time (Tc) control input to the RFIC |
| Angular FOV (HFOV, VFOV) | Two-way radiation pattern of each of the antenna array element $\{(\theta, \phi) \mid F_n(\theta, \phi) \geq -6 \text{ dB}\}$ | Control input to the reconfigurable antenna system |
| Range Resolution (Rres) | $R_{res} = \dfrac{c}{2BW}$ | Bandwidth (BW) control input to RFIC |
| Radial velocity Resolution (Vres) | $v_{res}^2 = \dfrac{\lambda}{2T_f}$ | Frame time ($T_f$) control input to RFIC |
| Angular | ($\theta_{3\,dB}$, $\phi_{3\,dB}$) | Control input to |
| Resolution (at boresight) (Hres, VerticalRes) | $F_{total}(\theta, \phi) > -3$ dB $F_{total} = F_0 + F_1 + \ldots + F_N$ | reconfigurable antenna array subsystem |

In other embodiments, feedback controller 350 may reconfigure any other additional or alternative parameters of the reconfigurable radio parameters 352 according to any other criteria.

In some demonstrative embodiments, radar architecture 300 may be trained, for example, utilizing a simulated dataset, and/or labeled field-collected data.

In some demonstrative embodiments, for example, a first training step may include training the neural network-based radar processing pipeline with synthetic data, which may be generated, for example, using a high-fidelity ray-tracing based radar target and/or channel modeling and simulation method. Such a pipeline may provide an advantage of the ground truth being readily available from a 3D model.

In some demonstrative embodiments, for example, another training step may include using labeled field collected data to fine-tune the neural network, e.g., to adapt to the real world.

Figure 5:
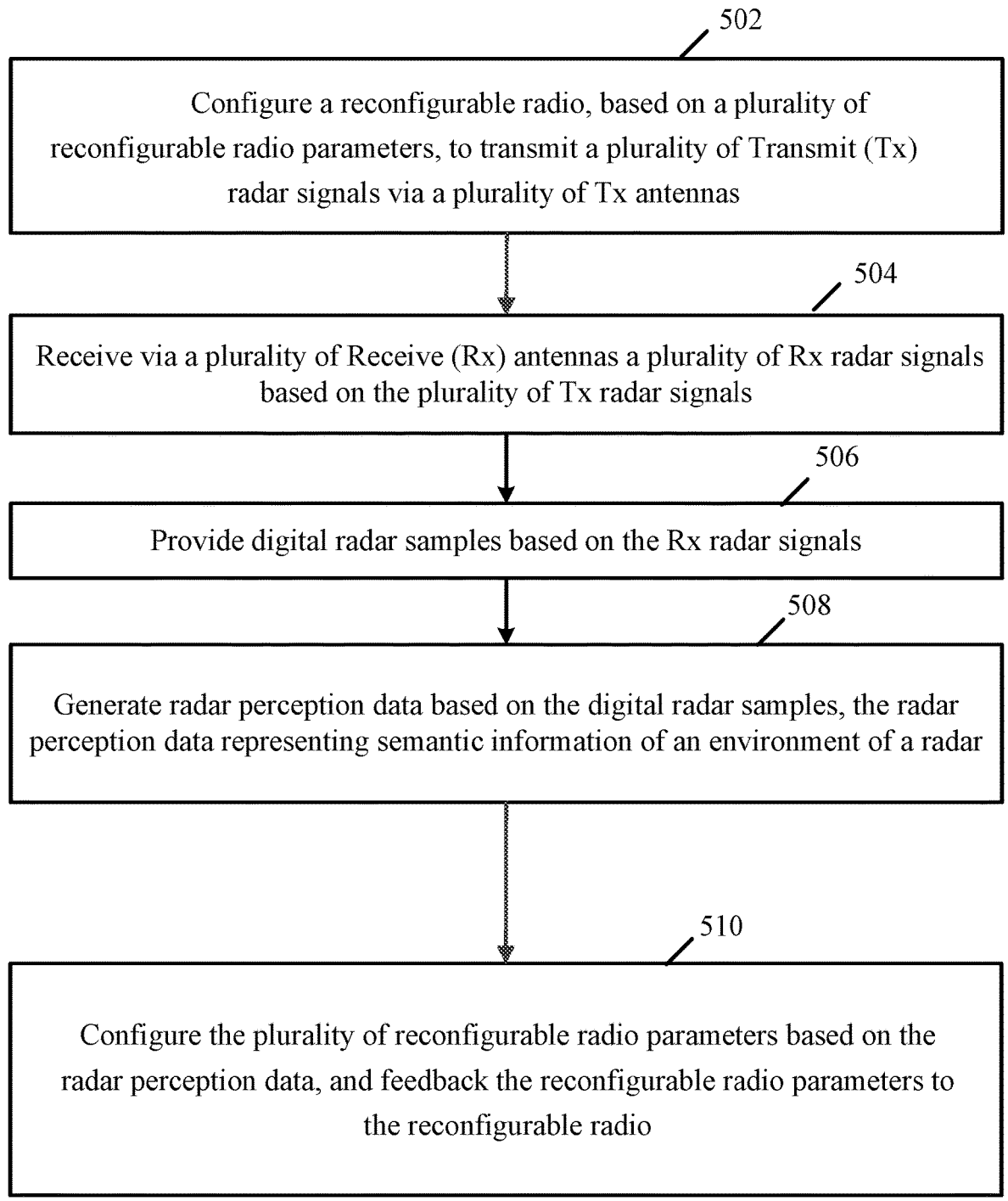
FIG. 5 is a schematic flow chart illustration of a method of generating radar perception data, in accordance with some demonstrative embodiments.

Reference is made to FIG. 5, which schematically illustrates a method of processing radar signals, in accordance with some demonstrative embodiments. For example, one or more operations of the method of FIG. 5 may be performed by one or more elements of a radar device, for example, a vehicle, e.g., vehicle 100 (FIG. 1), and/or any other device 100 (FIG. 1), for example, a radar, e.g., radar 102 (FIG. 1), a radar processor, e.g., radar processor 134 (FIG. 1), a reconfigurable radio, e.g., reconfigurable radio 110 (FIG. 1), a radar perception processor, e.g., radar perception processor 130 (FIG. 1), and/or a feedback controller, e.g., feedback controller 150 (FIG. 1).

As indicated at block 502, the method may include configuring a reconfigurable radio, based on a plurality of reconfigurable radio parameters, to transmit a plurality of Tx radar signals via a plurality of Tx antennas. For example, feedback controller 150 (FIG. 1) may configured reconfigurable radio 110 (FIG. 1) based on the plurality of reconfigurable radio parameters, to transmit the plurality of Tx radar signals 127 (FIG. 1) via the plurality of Tx antennas 107 (FIG. 1), e.g., as described above.

As indicated at block 504, the method may include configuring the reconfigurable radio, based on a plurality of reconfigurable radio parameters, to receive and process a plurality of Rx radar signals received via a plurality of Rx antennas, e.g., based on the plurality of Tx radar signals. For example, feedback controller 150 (FIG. 1) may configured reconfigurable radio 110 (FIG. 1) to receive and process the plurality of Rx radar signals 129 (FIG. 1) via the plurality of Rx antennas 109 (FIG. 1), e.g., as described above.

As indicated at block 506, the method may include providing digital radar samples based on the Rx radar signals. For example, reconfigurable radio 110 (FIG. 1) may provide the digital radar samples 112 (FIG. 1) based on the Rx radar signals 129 (FIG. 1), e.g., as described above.

As indicated at block 508, the method may include generating radar perception data based on the digital radar samples, the radar perception data representing semantic information of an environment of the radar. For example, radar perception processor 130 (FIG. 1) may generate the radar perception data 132 (FIG. 1) based on the digital radar samples 112 (FIG. 1), e.g., as described above.

As indicated at block 510, the method may include configuring the plurality of reconfigurable radio parameters based on the radar perception data, and feeding-back the reconfigurable radio parameters to the reconfigurable radio. For example, feedback controller 150 (FIG. 1) may configure the plurality of reconfigurable radio parameters 152 (FIG. 1), based on the radar perception data, and may feedback the reconfigurable radio parameters 152 (FIG. 1) to the reconfigurable radio 110 (FIG. 1), e.g., as described above.

In some demonstrative embodiments, for example, the generating of the radar perception data may optionally include generating reliability information, e.g., in the form of a reliability indicator to indicate the reliability of the radar perception data, e.g., as described above. According to these embodiments, configuring the plurality of reconfigurable radio parameters based on the radar perception data may optionally include configuring the plurality of reconfigurable radio parameters based on the radar perception data and the reliability information, e.g., as described above.

Figure 6:
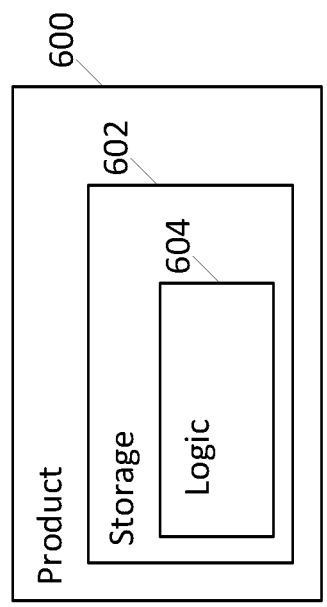
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at a device, e.g., vehicle 100 (FIG. 1), a radar, e.g., radar 102 (FIG. 1), radar processor 134 (FIG. 1), reconfigurable radio 110 (FIG. 1), radar perception processor 130 (FIG. 1), and/or feedback controller 150 (FIG. 1). Additionally or alternatively, storage media 602, which may include computer-executable instructions, e.g., implemented by logic 604, operable to, when executed by at least one computer processor, enable the at least one computer processor to cause device 100 (FIG. 1), radar 102 (FIG. 1), radar processor 134 (FIG. 1), reconfigurable radio 110 (FIG. 1), radar perception processor 130 (FIG. 1), and/or feedback controller 150 (FIG. 1), to perform, trigger and/or implement one or more operations and/or functionalities, e.g., as described herein. Additionally or alternatively, storage media 602, which may include computer-executable instructions, e.g., implemented by logic 604, operable to, when executed by at least one computer processor, enable the at least one computer processor to perform, trigger and/or implement one or more operations and/or functionalities described with reference to the FIGS. 1, 2, 3, 4 and/or 5, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 600 and/or machine-readable storage media 602 may include one or more types of computer-readable storage media capable of storing data, including volatile memory, non-volatile memory, removable or non-removable memory, erasable or non-erasable memory, writeable or re-writeable memory, and the like. For example, machine-readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE-PROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, Python, BASIC, Matlab, Pascal, Visual BASIC, assembly language, machine code, and the like.

EXAMPLES

The following examples pertain to further embodiments.

Example 1 includes an apparatus comprising a radar, the radar comprising a reconfigurable radio configured, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals; a radar perception processor configured to generate radar perception data based on the digital radar samples, the radar perception data representing semantic information of an environment of the radar; and a feedback controller to configure the plurality of reconfigurable radio parameters based on the radar perception data, and to feedback the reconfigurable radio parameters to the reconfigurable radio.

Example 2 includes the subject matter of Example 1, and optionally, wherein the radar perception processor is configured to provide a reliability indicator to indicate a reliability of the radar perception data, and wherein the feedback controller is to configure the plurality of reconfigurable radio parameters based on the reliability indicator.

Example 3 includes the subject matter of Example 1 or 2, and optionally, wherein the feedback controller comprises an Artificial Intelligence (AI) engine trainable according to at least one of the radar perception data, the digital radar samples, or intermediate radar processing data from the radar perception processor.

Example 4 includes the subject matter of any one of Examples 1-3, and optionally, wherein the feedback controller is to adaptively configure the plurality of reconfigurable radio parameters in real time based on previous radar perception data corresponding to previously processed digital radar samples.

Example 5 includes the subject matter of any one of Examples 1-4, and optionally, wherein the feedback controller is configured to configure the plurality of reconfigurable radio parameters based on the digital radar samples.

Example 6 includes the subject matter of any one of Examples 1-5, and optionally, wherein the radar perception processor comprises an Artificial Intelligence (AI) engine trainable according to the digital radar samples.

Example 7 includes the subject matter of any one of Examples 1-6, and optionally, wherein the radar perception processor comprises a range estimator configured to process the digital radar samples, and to provide range information comprising range estimates of objects in the environment; a transformer configured to transform the range estimates into Range-Doppler estimates of the objects; and a perception data generator configured to generate the radar perception data representing the semantic information of the environment of the radar based on the Range-Doppler estimates of the objects.

Example 8 includes the subject matter of Example 7, and optionally, wherein the digital radar samples comprise a plurality of streams of digital radar samples corresponding to the plurality of Rx antennas, respectively, and wherein the range estimator comprises a plurality of pre-processing filters configured to determine a respective plurality of initial range estimates based on the plurality of streams of digital radar samples, and a plurality of range estimation generators to generate the range information by applying to the initial range estimates one or more of a side-lobe suppression mechanism or an interference suppression mechanism.

Example 9 includes the subject matter of Example 8, and optionally, wherein the plurality of pre-processing filters comprises a plurality of pre-processing Artificial Intelligence (AI) engines, a pre-processing AI engine of the plurality of pre-processing AI engines is trainable based on a respective stream of digital radar samples of the plurality of streams of digital radar samples.

Example 10 includes the subject matter of Example 8 or 9, and optionally, wherein the plurality of range estimation generators comprises a plurality of range-estimation Artificial Intelligence (AI) engines, a range-estimation AI engine of the plurality of range-estimation AI engines is trainable based on a respective initial range estimate of the plurality of initial range estimates.

Example 11 includes the subject matter of any one of Examples 7-10, and optionally, wherein the perception data generator comprises a Hybrid Convolutional Neural Network (HCNN) configured to determine semantic and spatial information based on the Range-Doppler estimates of the objects; and a plurality of parallel Fully-Connected (FC) neural network branches to generate the radar perception data, an FC neural network branch of the plurality of FC neural network branches to generate a perception output of the radar perception data based on the semantic and spatial information from the HCNN.

Example 12 includes the subject matter of Example 11, and optionally, wherein the FC neural network branch is configured to provide a reliability indicator corresponding to an uncertainty of the perception output.

Example 13 includes the subject matter of any one of Examples 1-12, and optionally, wherein the reconfigurable radio comprises a plurality of reconfigurable Radio-Frequency (RF) Tx chains configured to transmit the Tx radar signals via the plurality of Tx antennas based on the plurality of reconfigurable radio parameters, and a plurality of reconfigurable RF Rx chains configured to process the Rx radar signals received via the plurality of Rx antennas based on the plurality of reconfigurable radio parameters.

Example 14 includes the subject matter of any one of Examples 1-13, and optionally, wherein the reconfigurable radio comprises a reconfigurable Radio-Frequency (RF) front-end, which is configurable, according to the plurality of reconfigurable radio parameters, to convert the Rx radar signals into the digital radar samples, and to generate the Tx radar signals.

Example 15 includes the subject matter of any one of Examples 1-14, and optionally, wherein the plurality of reconfigurable radio parameters comprises at least one of a beamforming parameter, a beam-nulling parameter, a polarization type parameter, a frame time of the Tx radar signals, a chirp time of the Tx radar signals, digital modulation characteristics of the Tx radar signals, a radiation pattern of the Tx signals, a polarization type of the Tx radar signals, a coding sequence of the Tx radar signals, or a center frequency of the Tx radar signals.

Example 16 includes the subject matter of any one of Examples 1-15, and optionally, wherein the digital radar samples comprise in-phase (I) and quadrature-phase (Q) (I/Q) digital samples based on the Rx radar signals.

Example 17 includes the subject matter of any one of Examples 1-16, and optionally, wherein the radar perception data comprises at least one of an object classification, a reliability of the object classification, an object range, a reliability of the object range, an object directionality, a reliability of the object directionality, an object speed, a reliability of the object speed, an object size, a reliability of the object size, an object mapping on a map, a reliability of the object mapping on the map, a drivable path mapping, a reliability of the drivable path mapping, a hazardous object mapping, or a reliability of the hazardous object mapping.

Example 18 includes the subject matter of any one of Examples 1-17, and optionally, comprising a radar processor to determine mapping information of the environment based on the radar perception data.

Example 19 includes the subject matter of any one of Examples 1-18, and optionally, comprising a vehicle.

Example 20 includes a vehicle comprising a system controller configured to control one or more vehicular systems of the vehicle based on radar information; and a radar device configured to provide the radar information to the system controller, the radar device comprising a reconfigurable radio configured, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals; a radar perception processor configured to generate radar perception data based on the digital radar samples, the radar perception data representing semantic information of an environment of the radar; and a feedback controller to configure the plurality of reconfigurable radio parameters based on the radar perception data, and to feedback the reconfigurable radio parameters to the reconfigurable radio;

and a radar processor to determine the radar information based on the radar perception data.

Example 21 includes the subject matter of Example 20, and optionally, wherein the radar perception processor is configured to provide a reliability indicator to indicate a reliability of the radar perception data, and wherein the feedback controller is to configure the plurality of reconfigurable radio parameters based on the reliability indicator.

Example 22 includes the subject matter of Example 20 or 21, and optionally, wherein the feedback controller comprises an Artificial Intelligence (AI) engine trainable according to at least one of the radar perception data, the digital radar samples, or intermediate radar processing data from the radar perception processor.

Example 23 includes the subject matter of any one of Examples 20-22, and optionally, wherein the feedback controller is to adaptively configure the plurality of reconfigurable radio parameters in real time based on previous radar perception data corresponding to previously processed digital radar samples.

Example 24 includes the subject matter of any one of Examples 20-23, and optionally, wherein the feedback controller is configured to configure the plurality of reconfigurable radio parameters based on the digital radar samples.

Example 25 includes the subject matter of any one of Examples 20-24, and optionally, wherein the radar perception processor comprises an Artificial Intelligence (AI) engine trainable according to the digital radar samples.

Example 26 includes the subject matter of any one of Examples 20-25, and optionally, wherein the radar perception processor comprises a range estimator configured to process the digital radar samples, and to provide range information comprising range estimates of objects in the environment; a transformer configured to transform the range estimates into Range-Doppler estimates of the objects; and a perception data generator configured to generate the radar perception data representing the semantic information of the environment of the radar based on the Range-Doppler estimates of the objects.

Example 27 includes the subject matter of Example 26, and optionally, wherein the digital radar samples comprise a plurality of streams of digital radar samples corresponding to the plurality of Rx antennas, respectively, and wherein the range estimator comprises a plurality of pre-processing filters configured to determine a respective plurality of initial range estimates based on the plurality of streams of digital radar samples, and a plurality of range estimation generators to generate the range information by applying to the initial range estimates one or more of a side-lobe suppression mechanism or an interference suppression mechanism.

Example 28 includes the subject matter of Example 27, and optionally, wherein the plurality of pre-processing filters comprises a plurality of pre-processing Artificial Intelligence (AI) engines, a pre-processing AI engine of the plurality of pre-processing AI engines is trainable based on a respective stream of digital radar samples of the plurality of streams of digital radar samples.

Example 29 includes the subject matter of Example 27 or 28, and optionally, wherein the plurality of range estimation generators comprises a plurality of range-estimation Artificial Intelligence (AI) engines, a range-estimation AI engine of the plurality of range-estimation AI engines is trainable based on a respective initial range estimate of the plurality of initial range estimates.

Example 30 includes the subject matter of any one of Examples 26-29, and optionally, wherein the perception data generator comprises a Hybrid Convolutional Neural Network (HCNN) configured to determine semantic and spatial information based on the Range-Doppler estimates of the objects; and a plurality of parallel Fully-Connected (FC) neural network branches to generate the radar perception data, an FC neural network branch of the plurality of FC neural network branches to generate a perception output of the radar perception data based on the semantic and spatial information from the HCNN.

Example 31 includes the subject matter of Example 30, and optionally, wherein the FC neural network branch is configured to provide a reliability indicator corresponding to an uncertainty of the perception output.

Example 32 includes the subject matter of any one of Examples 20-31, and optionally, wherein the reconfigurable radio comprises a plurality of reconfigurable Radio-Frequency (RF) Tx chains configured to transmit the Tx radar signals via the plurality of Tx antennas based on the plurality of reconfigurable radio parameters, and a plurality of reconfigurable RF Rx chains configured to process the Rx radar signals received via the plurality of Rx antennas based on the plurality of reconfigurable radio parameters.

Example 33 includes the subject matter of any one of Examples 20-32, and optionally, wherein the reconfigurable radio comprises a reconfigurable Radio-Frequency (RF) front-end, which is configurable, according to the plurality of reconfigurable radio parameters, to convert the Rx radar signals into the digital radar samples, and to generate the Tx radar signals.

Example 34 includes the subject matter of any one of Examples 20-33, and optionally, wherein the plurality of reconfigurable radio parameters comprises at least one of a beamforming parameter, a beam-nulling parameter, a polarization type parameter, a frame time of the Tx radar signals, a chirp time of the Tx radar signals, digital modulation characteristics of the Tx radar signals, a radiation pattern of the Tx signals, a polarization type of the Tx radar signals, a coding sequence of the Tx radar signals, or a center frequency of the Tx radar signals.

Example 35 includes the subject matter of any one of Examples 20-34, and optionally, wherein the digital radar samples comprise in-phase (I) and quadrature-phase (Q) (I/Q) digital samples based on the Rx radar signals.

Example 36 includes the subject matter of any one of Examples 20-35, and optionally, wherein the radar perception data comprises at least one of an object classification, a reliability of the object classification, an object range, a reliability of the object range, an object directionality, a reliability of the object directionality, an object speed, a reliability of the object speed, an object size, a reliability of the object size, an object mapping on a map, a reliability of the object mapping on the map, a drivable path mapping, a reliability of the drivable path mapping, a hazardous object mapping, or a reliability of the hazardous object mapping.

Example 37 includes a method comprising configuring a reconfigurable radio, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals; generating radar perception data based on the digital radar samples, the radar perception data representing semantic information of an environment of the radar; and configuring the plurality of reconfigurable radio parameters based on the radar perception data, and feeding-back the reconfigurable radio parameters to the reconfigurable radio.

Example 38 includes the subject matter of Example 37, and optionally, comprising providing a reliability indicator to indicate a reliability of the radar perception data, and configuring the plurality of reconfigurable radio parameters based on the reliability indicator.

Example 39 includes the subject matter of Example 37 or 38, and optionally, comprising configuring the plurality of reconfigurable radio parameters using an Artificial Intelligence (AI) engine trainable according to at least one of the radar perception data, the digital radar samples, or intermediate radar processing data from the radar perception processor.

Example 40 includes the subject matter of any one of Examples 37-39, and optionally, comprising adaptively configuring the plurality of reconfigurable radio parameters in real time based on previous radar perception data corresponding to previously processed digital radar samples.

Example 41 includes the subject matter of any one of Examples 37-40, and optionally, comprising configuring the plurality of reconfigurable radio parameters based on the digital radar samples.

Example 42 includes the subject matter of any one of Examples 37-41, and optionally, comprising generating the radar perception data using an Artificial Intelligence (AI) engine trainable according to the digital radar samples.

Example 43 includes the subject matter of any one of Examples 37-42, and optionally, comprising processing the digital radar samples to provide range information comprising range estimates of objects in the environment; transforming the range estimates into Range-Doppler estimates of the objects; and generating the radar perception data representing the semantic information of the environment of the radar based on the Range-Doppler estimates of the objects.

Example 44 includes the subject matter of Example 43, and optionally, wherein the digital radar samples comprise a plurality of streams of digital radar samples corresponding to the plurality of Rx antennas, respectively, and wherein processing the digital radar samples comprises using a plurality of pre-processing filters to determine a respective plurality of initial range estimates based on the plurality of streams of digital radar samples, and generating the range information by applying to the initial range estimates one or more of a side-lobe suppression mechanism or an interference suppression mechanism.

Example 45 includes the subject matter of Example 44, and optionally, wherein the plurality of pre-processing filters comprises a plurality of pre-processing Artificial Intelligence (AI) engines, a pre-processing AI engine of the plurality of pre-processing AI engines is trainable based on a respective stream of digital radar samples of the plurality of streams of digital radar samples.

Example 46 includes the subject matter of Example 44 or 45, and optionally, wherein generating the range information comprises using a plurality of range-estimation Artificial Intelligence (AI) engines, a range-estimation AI engine of the plurality of range-estimation AI engines is trainable based on a respective initial range estimate of the plurality of initial range estimates.

Example 47 includes the subject matter of any one of Examples 43-46, and optionally, comprising determining semantic and spatial information based on the Range-Doppler estimates of the objects using a Hybrid Convolutional Neural Network (HCNN); and generating the radar perception data using a plurality of parallel Fully-Connected (FC) neural network branches, an FC neural network branch of the plurality of FC neural network branches to generate a perception output of the radar perception data based on the semantic and spatial information.

Example 48 includes the subject matter of Example 47, and optionally, comprising using the FC neural network branch to provide a reliability indicator corresponding to an uncertainty of the perception output.

Example 49 includes the subject matter of any one of Examples 37-48, and optionally, wherein configuring the reconfigurable radio comprises configuring a plurality of reconfigurable Radio-Frequency (RF) Tx chains to transmit the Tx radar signals via the plurality of Tx antennas based on the plurality of reconfigurable radio parameters, and configuring a plurality of reconfigurable RF Rx chains to process the Rx radar signals received via the plurality of Rx antennas based on the plurality of reconfigurable radio parameters.

Example 50 includes the subject matter of any one of Examples 37-49, and optionally, wherein configuring the reconfigurable radio comprises configuring a reconfigurable Radio-Frequency (RF) front-end according to the plurality of reconfigurable radio parameters to convert the Rx radar signals into the digital radar samples, and to generate the Tx radar signals.

Example 51 includes the subject matter of Example 37-50, and optionally, wherein the plurality of reconfigurable radio parameters comprises at least one of a beamforming parameter, a beam-nulling parameter, a polarization type parameter, a frame time of the Tx radar signals, a chirp time of the Tx radar signals, digital modulation characteristics of the Tx radar signals, a radiation pattern of the Tx signals, a polarization type of the Tx radar signals, a coding sequence of the Tx radar signals, or a center frequency of the Tx radar signals.

Example 52 includes the subject matter of any one of Examples 37-51, and optionally, wherein the digital radar samples comprise in-phase (I) and quadrature-phase (Q) (I/Q) digital samples based on the Rx radar signals.

Example 53 includes the subject matter of any one of Examples 37-52, and optionally, wherein the radar perception data comprises at least one of an object classification, a reliability of the object classification, an object range, a reliability of the object range, an object directionality, a reliability of the object directionality, an object speed, a reliability of the object speed, an object size, a reliability of the object size, an object mapping on a map, a reliability of the object mapping on the map, a drivable path mapping, a reliability of the drivable path mapping, a hazardous object mapping, or a reliability of the hazardous object mapping.

Example 54 includes the subject matter of any one of Examples 37-53, and optionally, comprising determining mapping information of the environment based on the radar perception data.

Example 55 includes an apparatus comprising means for configuring a reconfigurable radio, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals; means for generating radar perception data based on the digital radar samples, the radar perception data representing semantic information of an environment of the radar; and means for configuring the plurality of reconfigurable radio parameters based on the radar perception data, and feeding-back the reconfigurable radio parameters to the reconfigurable radio.

Example 56 includes the subject matter of Example 55, and optionally, comprising means for providing a reliability indicator to indicate a reliability of the radar perception data, and means for configuring the plurality of reconfigurable radio parameters based on the reliability indicator.

Example 57 includes the subject matter of Example 55 or 56, and optionally, comprising means for configuring the plurality of reconfigurable radio parameters using an Artificial Intelligence (AI) engine trainable according to at least one of the radar perception data, the digital radar samples, or intermediate radar processing data from the radar perception processor.

Example 58 includes the subject matter of any one of Examples 55-57, and optionally, comprising means for adaptively configuring the plurality of reconfigurable radio parameters in real time based on previous radar perception data corresponding to previously processed digital radar samples.

Example 59 includes the subject matter of any one of Examples 55-58, and optionally, comprising means for configuring the plurality of reconfigurable radio parameters based on the digital radar samples.

Example 60 includes the subject matter of any one of Examples 55-59, and optionally, comprising means for generating the radar perception data using an Artificial Intelligence (AI) engine trainable according to the digital radar samples.

Example 61 includes the subject matter of any one of Examples 55-60, and optionally, comprising means for processing the digital radar samples to provide range information comprising range estimates of objects in the environment; means for transforming the range estimates into Range-Doppler estimates of the objects; and means for generating the radar perception data representing the semantic information of the environment of the radar based on the Range-Doppler estimates of the objects.

Example 62 includes the subject matter of Example 61, and optionally, wherein the digital radar samples comprise a plurality of streams of digital radar samples corresponding to the plurality of Rx antennas, respectively, and wherein the means for processing the digital radar samples comprises means for using a plurality of pre-processing filters to determine a respective plurality of initial range estimates based on the plurality of streams of digital radar samples, and generating the range information by applying to the initial range estimates one or more of a side-lobe suppression mechanism or an interference suppression mechanism.

Example 63 includes the subject matter of Example 62, and optionally, wherein the plurality of pre-processing filters comprises a plurality of pre-processing Artificial Intelligence (AI) engines, a pre-processing AI engine of the plurality of pre-processing AI engines is trainable based on a respective stream of digital radar samples of the plurality of streams of digital radar samples.

Example 64 includes the subject matter of Example 62 or 63, and optionally, wherein the means for generating the range information comprises means for using a plurality of range-estimation Artificial Intelligence (AI) engines, a range-estimation AI engine of the plurality of range-estimation AI engines is trainable based on a respective initial range estimate of the plurality of initial range estimates.

Example 65 includes the subject matter of any one of Examples 61-64, and optionally, comprising means for determining semantic and spatial information based on the Range-Doppler estimates of the objects using a Hybrid Convolutional Neural Network (HCNN); and generating the radar perception data using a plurality of parallel Fully-Connected (FC) neural network branches, an FC neural network branch of the plurality of FC neural network branches to generate a perception output of the radar perception data based on the semantic and spatial information.

Example 66 includes the subject matter of Example 65, and optionally, comprising means for using the FC neural network branch to provide a reliability indicator corresponding to an uncertainty of the perception output.

Example 67 includes the subject matter of any one of Examples 55-66, and optionally, wherein the means for configuring the reconfigurable radio comprises means for configuring a plurality of reconfigurable Radio-Frequency (RF) Tx chains to transmit the Tx radar signals via the plurality of Tx antennas based on the plurality of reconfigurable radio parameters, and configuring a plurality of reconfigurable RF Rx chains to process the Rx radar signals received via the plurality of Rx antennas based on the plurality of reconfigurable radio parameters.

Example 68 includes the subject matter of any one of Examples 55-66, and optionally, wherein the means for configuring the reconfigurable radio comprises means for configuring a reconfigurable Radio-Frequency (RF) front-end according to the plurality of reconfigurable radio parameters to convert the Rx radar signals into the digital radar samples, and means for generating the Tx radar signals.

Example 69 includes the subject matter of Example 55-68, and optionally, wherein the plurality of reconfigurable radio parameters comprises at least one of a beamforming parameter, a beam-nulling parameter, a polarization type parameter, a frame time of the Tx radar signals, a chirp time of the Tx radar signals, digital modulation characteristics of the Tx radar signals, a radiation pattern of the Tx signals, a polarization type of the Tx radar signals, a coding sequence of the Tx radar signals, or a center frequency of the Tx radar signals.

Example 70 includes the subject matter of any one of Examples 55-69, and optionally, wherein the digital radar samples comprise in-phase (I) and quadrature-phase (Q) (I/Q) digital samples based on the Rx radar signals.

Example 71 includes the subject matter of any one of Examples 55-70, and optionally, wherein the radar perception data comprises at least one of an object classification, a reliability of the object classification, an object range, a reliability of the object range, an object directionality, a reliability of the object directionality, an object speed, a reliability of the object speed, an object size, a reliability of the object size, an object mapping on a map, a reliability of the object mapping on the map, a drivable path mapping, a reliability of the drivable path mapping, a hazardous object mapping, or a reliability of the hazardous object mapping.

Example 72 includes the subject matter of any one of Examples 55-71, and optionally, comprising means for determining mapping information of the environment based on the radar perception data.

Example 73 includes a product comprising one or more tangible computer-readable non-transitory storage media comprising computer-executable instructions operable to, when executed by at least one processor, enable the at least one processor to cause a radar device to configure a reconfigurable radio, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals; generate radar perception data based on the digital radar samples, the radar perception data representing semantic information of an environment of the radar; and configure the plurality of reconfigurable radio parameters based on the radar perception data, and feed-back the reconfigurable radio parameters to the reconfigurable radio.

Example 74 includes the subject matter of Example 73, and optionally, wherein the instructions, when executed, cause the radar device to provide a reliability indicator to indicate a reliability of the radar perception data, and to configure the plurality of reconfigurable radio parameters based on the reliability indicator.

Example 75 includes the subject matter of Example 73 or 74, and optionally, wherein the instructions, when executed, cause the radar device to configure the plurality of reconfigurable radio parameters using an Artificial Intelligence (AI) engine trainable according to at least one of the radar perception data, the digital radar samples, or intermediate radar processing data from the radar perception processor.

Example 76 includes the subject matter of any one of Examples 73-75, and optionally, wherein the instructions, when executed, cause the radar device to adaptively configure the plurality of reconfigurable radio parameters in real time based on previous radar perception data corresponding to previously processed digital radar samples.

Example 77 includes the subject matter of any one of Examples 73-76, and optionally, wherein the instructions, when executed, cause the radar device to configure the plurality of reconfigurable radio parameters based on the digital radar samples.

Example 78 includes the subject matter of any one of Examples 73-77, and optionally, wherein the instructions, when executed, cause the radar device to generate the radar perception data using an Artificial Intelligence (AI) engine trainable according to the digital radar samples.

Example 79 includes the subject matter of any one of Examples 73-78, and optionally, wherein the instructions, when executed, cause the radar device to process the digital radar samples to provide range information comprising range estimates of objects in the environment; transform the range estimates into Range-Doppler estimates of the objects; and generate the radar perception data representing the semantic information of the environment of the radar based on the Range-Doppler estimates of the objects.

Example 80 includes the subject matter of Example 79, and optionally, wherein the digital radar samples comprise a plurality of streams of digital radar samples corresponding to the plurality of Rx antennas, respectively, and wherein, the instructions, when executed, cause the radar device to process the digital radar samples using a plurality of pre-processing filters to determine a respective plurality of initial range estimates based on the plurality of streams of digital radar samples, and to generate the range information by applying to the initial range estimates one or more of a side-lobe suppression mechanism or an interference suppression mechanism.

Example 81 includes the subject matter of Example 80, and optionally, wherein the plurality of pre-processing filters comprises a plurality of pre-processing Artificial Intelligence (AI) engines, a pre-processing AI engine of the plurality of pre-processing AI engines is trainable based on a respective stream of digital radar samples of the plurality of streams of digital radar samples.

Example 82 includes the subject matter of Example 80 or 81, and optionally, wherein, the instructions, when executed, cause the radar device to generate the range information using a plurality of range-estimation Artificial Intelligence (AI) engines, a range-estimation AI engine of the plurality of range-estimation AI engines is trainable based on a respective initial range estimate of the plurality of initial range estimates.

Example 83 includes the subject matter of any one of Examples 79-82, and optionally, wherein the instructions, when executed, cause the radar device to determine semantic and spatial information based on the Range-Doppler estimates of the objects using a Hybrid Convolutional Neural Network (HCNN); and generate the radar perception data using a plurality of parallel Fully-Connected (FC) neural network branches, an FC neural network branch of the plurality of FC neural network branches to generate a perception output of the radar perception data based on the semantic and spatial information.

Example 84 includes the subject matter of Example 83, and optionally, wherein the instructions, when executed, cause the radar device to use the FC neural network branch to provide a reliability indicator corresponding to an uncertainty of the perception output.

Example 85 includes the subject matter of any one of Examples 73-84, and optionally, wherein the instructions, when executed, cause the radar device to configure the reconfigurable radio by configuring a plurality of reconfigurable Radio-Frequency (RF) Tx chains to transmit the Tx radar signals via the plurality of Tx antennas based on the plurality of reconfigurable radio parameters, and configuring a plurality of reconfigurable RF Rx chains to process the Rx radar signals received via the plurality of Rx antennas based on the plurality of reconfigurable radio parameters.

Example 86 includes the subject matter of any one of Examples 73-85, and optionally, wherein the instructions, when executed, cause the radar device to configure the reconfigurable radio by configuring a reconfigurable Radio-Frequency (RF) front-end according to the plurality of reconfigurable radio parameters to convert the Rx radar signals into the digital radar samples, and to generate the Tx radar signals.

Example 87 includes the subject matter of Example 73-86, and optionally, wherein the plurality of reconfigurable radio parameters comprises at least one of a beamforming parameter, a beam-nulling parameter, a polarization type parameter, a frame time of the Tx radar signals, a chirp time of the Tx radar signals, digital modulation characteristics of the Tx radar signals, a radiation pattern of the Tx signals, a polarization type of the Tx radar signals, a coding sequence of the Tx radar signals, or a center frequency of the Tx radar signals.

Example 88 includes the subject matter of any one of Examples 73-87, and optionally, wherein the digital radar samples comprise in-phase (I) and quadrature-phase (Q) (I/Q) digital samples based on the Rx radar signals.

Example 89 includes the subject matter of any one of Examples 73-88, and optionally, wherein the radar perception data comprises at least one of an object classification, a reliability of the object classification, an object range, a reliability of the object range, an object directionality, a reliability of the object directionality, an object speed, a reliability of the object speed, an object size, a reliability of the object size, an object mapping on a map, a reliability of the object mapping on the map, a drivable path mapping, a reliability of the drivable path mapping, a hazardous object mapping, or a reliability of the hazardous object mapping.

Example 90 includes the subject matter of any one of Examples 73-89, and optionally, wherein the instructions, when executed, cause the radar device to determine mapping information of the environment based on the radar perception data.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a radar, the radar comprising:
a reconfigurable radio configured, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals;
a radar perception processor configured to generate radar perception data based on the digital radar samples, the radar perception data representing semantic information of an environment of the radar, wherein the radar perception processor is configured to provide a reliability indicator to indicate a reliability of the radar perception data; and
a feedback controller to configure the plurality of reconfigurable radio parameters based on the radar perception data and the reliability indicator, and to feedback the reconfigurable radio parameters to the reconfigurable radio.

2. The apparatus of claim 1, wherein the feedback controller comprises an Artificial Intelligence (AI) engine trainable according to at least one of the radar perception data, the digital radar samples, or intermediate radar processing data from the radar perception processor.

3. The apparatus of claim 1, wherein the feedback controller is to adaptively configure the plurality of reconfigurable radio parameters in real time based on previous radar perception data corresponding to previously processed digital radar samples.

4. The apparatus of claim 1, wherein the radar perception processor comprises an Artificial Intelligence (AI) engine trainable according to the digital radar samples.

5. The apparatus of claim 1, wherein the radar perception processor comprises:
a range estimator configured to process the digital radar samples, and to provide range information comprising range estimates of objects in the environment;
a transformer configured to transform the range estimates into Range-Doppler estimates of the objects; and
a perception data generator configured to generate the radar perception data representing the semantic information of the environment of the radar based on the Range-Doppler estimates of the objects.

6. The apparatus of claim 5, wherein the digital radar samples comprise a plurality of streams of digital radar samples corresponding to the plurality of Rx antennas, respectively, and wherein the range estimator comprises a plurality of pre-processing filters configured to determine a respective plurality of initial range estimates based on the plurality of streams of digital radar samples, and a plurality of range estimation generators to generate the range information by applying to the initial range estimates one or more of a side-lobe suppression mechanism or an interference suppression mechanism.

7. The apparatus of claim 6, wherein the plurality of pre-processing filters comprises a plurality of pre-processing Artificial Intelligence (AI) engines, a pre-processing AI engine of the plurality of pre-processing AI engines is trainable based on a respective stream of digital radar samples of the plurality of streams of digital radar samples.

8. The apparatus of claim 6, wherein the plurality of range estimation generators comprises a plurality of range-estimation Artificial Intelligence (AI) engines, a range-estimation AI engine of the plurality of range-estimation AI engines is trainable based on a respective initial range estimate of the plurality of initial range estimates.

9. The apparatus of claim 5, wherein the perception data generator comprises:
a Hybrid Convolutional Neural Network (HCNN) configured to determine semantic and spatial information based on the Range-Doppler estimates of the objects; and
a plurality of parallel Fully-Connected (FC) neural network branches to generate the radar perception data, an FC neural network branch of the plurality of FC neural network branches to generate a perception output of the radar perception data based on the semantic and spatial information from the HCNN.

10. The apparatus of claim 1, wherein the reconfigurable radio comprises a plurality of reconfigurable Radio-Frequency (RF) Tx chains configured to transmit the Tx radar signals via the plurality of Tx antennas based on the plurality of reconfigurable radio parameters, and a plurality of reconfigurable RF Rx chains configured to process the Rx radar signals received via the plurality of Rx antennas based on the plurality of reconfigurable radio parameters.

11. The apparatus of claim 1, wherein the reconfigurable radio comprises a reconfigurable Radio-Frequency (RF) front-end, which is configurable, according to the plurality of reconfigurable radio parameters, to convert the Rx radar signals into the digital radar samples, and to generate the Tx radar signals.

12. The apparatus of claim 1, wherein the plurality of reconfigurable radio parameters comprises at least one of a beamforming parameter, a beam-nulling parameter, a polarization type parameter, a frame time of the Tx radar signals, a chirp time of the Tx radar signals, digital modulation characteristics of the Tx radar signals, a radiation pattern of the Tx radar signals, a polarization type of the Tx radar signals, a coding sequence of the Tx radar signals, or a center frequency of the Tx radar signals.

13. The apparatus of claim 1, wherein the radar perception data comprises at least one of an object classification, a reliability of the object classification, an object range, a reliability of the object range, an object directionality, a reliability of the object directionality, an object speed, a reliability of the object speed, an object size, a reliability of the object size, an object mapping on a map, a reliability of the object mapping on the map, a drivable path mapping, a reliability of the drivable path mapping, a hazardous object mapping, or a reliability of the hazardous object mapping.

14. The apparatus of claim 1 comprising a radar processor to determine mapping information of the environment based on the radar perception data.

15. A vehicle comprising:
a system controller configured to control one or more vehicular systems of the vehicle based on radar information; and a radar device configured to provide the radar information to the system controller, the radar device comprising:
  a reconfigurable radio configured, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals;
  a radar perception processor configured to generate radar perception data based on the digital radar samples, the radar perception data representing semantic information of an environment of the radar device, wherein the radar perception processor is configured to provide a reliability indicator to indicate a reliability of the radar perception data;
  a feedback controller to configure the plurality of reconfigurable radio parameters based on the radar perception data and the reliability indicator, and to feedback the reconfigurable radio parameters to the reconfigurable radio; and
  a radar processor to determine the radar information based on the radar perception data.

16. The vehicle of claim 15, wherein the reconfigurable radio comprises a plurality of reconfigurable Radio-Frequency (RF) Tx chains configured to transmit the Tx radar signals via the plurality of Tx antennas based on the plurality of reconfigurable radio parameters, and a plurality of reconfigurable RF Rx chains configured to process the Rx radar signals received via the plurality of Rx antennas based on the plurality of reconfigurable radio parameters.

17. The vehicle of claim 15, wherein the feedback controller comprises an Artificial Intelligence (AI) engine trainable according to at least one of the radar perception data, the digital radar samples, or intermediate radar processing data from the radar perception processor.

18. The vehicle of claim 15, wherein the radar perception processor comprises an Artificial Intelligence (AI) engine trainable according to the digital radar samples.

19. The vehicle of claim 15, wherein the radar perception processor comprises:
  a range estimator configured to process the digital radar samples, and to provide range information comprising range estimates of objects in the environment;
  a transformer configured to transform the range estimates into Range-Doppler estimates of the objects; and
  a perception data generator configured to generate the radar perception data representing the semantic information of the environment of the radar device based on the Range-Doppler estimates of the objects.

20. The vehicle of claim 19, wherein the perception data generator comprises:
  a Hybrid Convolutional Neural Network (HCNN) configured to determine semantic and spatial information based on the Range-Doppler estimates of the objects; and
  a plurality of parallel Fully-Connected (FC) neural network branches to generate the radar perception data, an FC neural network branch of the plurality of FC neural network branches to generate a perception output of the radar perception data based on the semantic and spatial information from the HCNN.

21. A product comprising one or more tangible computer-readable non-transitory storage media comprising computer-executable instructions operable to, when executed by at least one processor, enable the at least one processor to cause a radar device to:
  configure a reconfigurable radio, based on a plurality of reconfigurable radio parameters, to transmit a plurality of Transmit (Tx) radar signals via a plurality of Tx antennas, to receive via a plurality of Receive (Rx) antennas a plurality of Rx radar signals based on the plurality of Tx radar signals, and to provide digital radar samples based on the Rx radar signals;
  generate radar perception data based on the digital radar samples, the radar perception data representing semantic information of an environment of the radar device;
  provide a reliability indicator to indicate a reliability of the radar perception data; and
  configure the plurality of reconfigurable radio parameters based on the radar perception data and the reliability indicator, and feed-back the reconfigurable radio parameters to the reconfigurable radio.

22. The product of claim 21, wherein the instructions, when executed, cause the radar device to adaptively configure the plurality of reconfigurable radio parameters in real time based on previous radar perception data corresponding to previously processed digital radar samples.

23. The product of claim 21, wherein the instructions, when executed, cause the radar device to:
  process the digital radar samples to provide range information comprising range estimates of objects in the environment;
  transform the range estimates into Range-Doppler estimates of the objects; and
  generate the radar perception data representing the semantic information of the environment of the radar device based on the Range-Doppler estimates of the objects.

24. The product of claim 23, wherein the instructions, when executed, cause the radar device to:
  determine semantic and spatial information based on the Range-Doppler estimates of the objects using a Hybrid Convolutional Neural Network (HCNN); and
  generate the radar perception data using a plurality of parallel Fully-Connected (FC) neural network branches, an FC neural network branch of the plurality of FC neural network branches to generate a perception output of the radar perception data based on the semantic and spatial information.

* * * * *